US012088521B2

(12) United States Patent
Zou et al.

(10) Patent No.: US 12,088,521 B2
(45) Date of Patent: Sep. 10, 2024

(54) SELECTIVE SSB RECEPTION FOR USER EQUIPMENT (UE) RECEIVER TUNING

(71) Applicant: Telefonaktiebolaget LM Ericsson (publ), Stockholm (SE)

(72) Inventors: Gang Zou, Lund (SE); Sina Maleki, Malmö (SE); Ilmiawan Shubhi, Malmö (SE); Andres Reial, Lomma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 17/606,675

(22) PCT Filed: Apr. 28, 2020

(86) PCT No.: PCT/EP2020/061678
§ 371 (c)(1),
(2) Date: Oct. 26, 2021

(87) PCT Pub. No.: WO2020/221711
PCT Pub. Date: Nov. 5, 2020

(65) Prior Publication Data
US 2022/0209911 A1    Jun. 30, 2022

Related U.S. Application Data

(60) Provisional application No. 62/842,257, filed on May 2, 2019.

(51) Int. Cl.
*H04L 5/00* (2006.01)
(52) U.S. Cl.
CPC ................... *H04L 5/0048* (2013.01)
(58) Field of Classification Search
None
See application file for complete search history.

(56) References Cited

U.S. PATENT DOCUMENTS 9,497,047 B2   11/2016 Josiam et al.
2015/0208265 A1   7/2015 Dalsgaard et al.
(Continued)

FOREIGN PATENT DOCUMENTS

WO    2019006031 A1   1/2019

OTHER PUBLICATIONS

"3GPP TS 23.501 V16.0.0", 3rd Generation Partnership Project; Technical Specification Group Services and System Aspects; System Architecture for the 5G System; Stage 2 (Release 16), Mar. 2019, pp. 1-318.
(Continued)

*Primary Examiner* — Diane L Lo
(74) *Attorney, Agent, or Firm* — Sage Patent Group

(57) ABSTRACT

A user equipment (UE) is configured to calibrate a receiver during operation in a wireless network. The UE comprises a radio transceiver configured to communicate with the wireless network; and processing circuitry operatively associated with the radio transceiver. The transceiver is arranged to receive a first reference signal associated with a first reception condition, receive a second reference signal associated with a second reception condition, and then either receive a third reference signal, when the processing circuitry determines that the conditions of the first and second reception conditions differ above a first threshold, and receive a message with receiver settings based on reception conditions of the third reference signal, or receive the message with a receiver setting based on receiver conditions of any one of the first and the second reference signals, when the processing circuitry determines that the conditions of the first and second reception conditions differ below the first threshold, enabling omitting reception of the third reference signal. A method and computer program are also disclosed.

15 Claims, 11 Drawing Sheets

(56) References Cited

U.S. PATENT DOCUMENTS

2019/0052334 A1* 2/2019 Jeon .................. H04W 74/0833
2019/0074887 A1   3/2019 Yiu et al.
2020/0153498 A1* 5/2020 Kotecha ............... H04B 7/0695
2021/0058913 A1* 2/2021 Jang ..................... H04W 24/08
2023/0033126 A1* 2/2023 Agiwal .................... H04L 5/14

OTHER PUBLICATIONS

"3GPP TS 33.401 V15.7.0", 3rd Generation Partnership Project; Technical Specification Group Services and System Aspects; 3GPP System Architecture Evolution (SAE); Security architecture (Release 15), Mar. 2019, pp. 1-163.

"Considerations on NR RRM power saving with additional resource", 3GPP TSG RAN WG1 Meeting RAN1 #95; R1-1812363, Spokane, U.S., Nov. 12-16, 2018, pp. 1-8.

"Further discussion on NR SCell activation delay requirements", 3GPP TSG-RAN WG4 Meeting #86bis; R4-1804185; Melbourne, AU, Apr. 12-16, 2018, pp. 1-5.

"NR RRM UE power saving", 3GPP TSG RAN WG1 Meeting RAN1-AH-1901; R1-1901299; Taipei, Taiwan, Jan. 21-25, 2019, pp. 1-9.

"Summary of UE power Consumption Reduction in RRM Measurements", 3GPP TSG RAN WG1 Meeting #95; R1-1814099; Spokane, USA, Nov. 12-16, 2018, pp. 1-17.

"3GPP TS 38.211 V15.5.0", 3rd Generation Partnership Project; Technical Specification Group Radio Access Network; NR; Physical channels and modulation (Release 15), Mar. 2019, pp. 1-96.

"3GPP TS 36.213 V15.7.0", 3rd Generation Partnership Project; Technical Specification Group Radio Access Network; Evolved Universal Terrestrial Radio Access (E-UTRA); Physical layer procedures (Release 15), Sep. 2019, pp. 1-551.

* cited by examiner

SELECTIVE SSB RECEPTION FOR USER EQUIPMENT (UE) RECEIVER TUNING

TECHNICAL FIELD

The present invention generally relates to wireless communication networks, and particularly relates to improvements to user equipment (UE) energy consumption.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

An overall exemplary architecture of a network comprising LTE and SAE is shown in FIG. 1. E-UTRAN 100 comprises one or more evolved Node B's (network node), such as network nodes 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the network nodes, such as network nodes 105, 110, and 115. The network nodes in the E-UTRAN communicate with each other via the X2 interface, as shown in FIG. 1. The network nodes also are responsible for the E-UTRAN interface to the EPC, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling protocols between the UE and the EPC, which are known as the Non-Access Stratum (NAS) protocols. The S-GW handles all Internet Procotol (IP) data packets between the UE and the EPC, and serves as the local mobility anchor for the data bearers when the UE moves between network nodes, such as network nodes 105, 110, and 115.

FIG. 2 shows a high-level block diagram of an exemplary LTE architecture in terms of its constituent entities—UE, E-UTRAN, and EPC—and high-level functional division into the Access Stratum (AS) and the Non-Access Stratum (NAS). FIG. 1 also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 3 illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 4 shows a block diagram of an exemplary LTE radio interface protocol architecture from the perspective of the PHY. The interfaces between the various layers are provided by Service Access Points (SAPs), indicated by the ovals in FIG. 4. The PHY layer interfaces with the MAC and RRC protocol layers described above. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation; and demodulation of physical channels; transmit diversity, beamforming multiple input multiple output (MIMO) antenna processing; and providing radio measurements to higher layers, such as RRC.

The multiple access scheme for the LTE PHY is based on Orthogonal Frequency Division Multiplexing (OFDM) with a cyclic prefix (CP) in the downlink (DL), and on Single-Carrier Frequency Division Multiple Access (SC-FDMA) with a cyclic prefix in the uplink (UL). To support transmission in paired and unpaired spectrum, the LTE PHY supports both Frequency Division Duplexing (FDD) (including both full- and half-duplex operation) and Time Division Duplexing (TDD).

FIG. 5 shows an exemplary radio frame structure ("type 1") used for LTE FDD DL operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 5, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz sub-carrier spacing (SCS), a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB} = n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 6 shows an exemplary LTE FDD UL radio frame configured in a similar manner as the exemplary FDD DL radio frame shown in FIG. 5. Using terminology consistent with the above DL description, each UL slot consists of $N^{UL}_{symb}$ OFDM symbols, each of which is comprised of $N_{sc}$ OFDM subcarriers.

Generally speaking, a physical channel corresponds to a set of REs (or PRBs) carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDSCH is used for transmitting downlink control information (DCI), mainly scheduling decisions, required for reception of PDSCH, and for uplink scheduling grants enabling transmission on PUSCH. PHICH carries HARQ feedback (e.g., ACK/NAK) for UL transmissions by the UEs.

Uplink (i.e., UE to eNB) physical channels provided by the LTE PHY include Physical Uplink Shared Channel (PUSCH), Physical Uplink Control Channel (PUCCH), and Physical Random-Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel. PUSCH is the uplink counterpart to the PDSCH. PUCCH is used by UEs to transmit uplink control information, including HARQ acknowledgements, channel state information reports, etc. PRACH is used for random access preamble transmission.

Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs. The number of CCEs aggregated for transmission of a PDCCH to a particular UE is referred to as "aggregation level" (or "AL" for short).

FIG. 7 illustrates one exemplary manner in which the CCEs and REGs can be mapped to a physical resource, e.g., PRBs. As shown in FIG. 6, the REGs comprising the CCEs of the PDCCH can be mapped into the first three symbols of a subframe, whereas the remaining symbols are available for other physical channels, such as the PDSCH which carries user data. In the exemplary arrangement of FIG. 7, each of the REGs comprises four REs, which are represented by the small, dashed-line rectangles. Although two CCEs are shown in FIG. 7, the number of CCEs may vary depending on the required PDCCH capacity, which can be determined based on number of users, amount of measurements and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI) indicated by the PCFICH transmitted in the first symbol of the control region.

To support mobility (e.g., handover or reselection) between cells and/or beams, a UE can perform periodic cell search and measurements of signal power and quality (e.g., reference signal received power, RSRP, and Reference signal received quality, RSRQ) in both Connected and Idle modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN reference signals, UE-specific Reference Signal (DM-RS) associated with PDSCH, Demodulation Reference Signal (DM-RS) associated with EPDCCH or MPDCCH, Positioning Reference Signal (PRS), and CSI Reference Signal (CSI-RS).

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols.

In Rel-15 NR, a UE can be configured with up to four carrier bandwidth parts (BWPs) in the DL with a single DL carrier BWP being active at a given time. A UE can be configured with up to four carrier BWPs in the UL with a single UL carrier BWP being active at a given time. If a UE is configured with a supplementary UL, the UE can be configured with up to four additional carrier BWPs in the supplementary UL, with a single supplementary UL carrier BWP being active at a given time.

FIG. 8 shows an exemplary time-frequency resource grid for an NR slot. As illustrated in FIG. 8, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at any given time.

Within a BWP, RBs are defined and numbered in the frequency domain from 0 to $N_{BWP_i}^{size}$, $-1$, where i is the index of the particular BWP for the carrier. Similar to LTE, each NR resource element (RE) corresponds to one OFDM subcarrier during one OFDM symbol interval. Various SCS values (referred to as numerologies) are supported in NR and are given by $\Delta f = (15 \times 2^\alpha)$ kHz where $\alpha \in (0, 1, 2, 3, 4)$. $\Delta f = 15$ kHz is the basic (or reference) subcarrier spacing that is also used in LTE. The slot length is inversely related to subcarrier spacing or numerology according to $\frac{1}{2^\mu}$ ms. For example, there is one (1-ms) slot per subframe for $\Delta f = 15$ kHz, two 0.5-ms slots per subframe for $\Delta f = 30$ kHz, etc. In addition, the RB bandwidth is directly related to numerology according to $2^\alpha * 180$ kHz.

Table 1 below summarizes supported NR transmission numerologies and associated parameters. Different DL and UL numerologies can be configured by the network.

TABLE 1

| $\mu$ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 µs | 1.44 |
| 4 | 240 | Normal | 62.5 µs | 2.88 |

An NR slot can include 14 OFDM symbols for normal cyclic prefix and 12 OFDM symbols for extended cyclic prefix. FIG. 9 shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 6 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). Even so, mini-slots are not service-specific and can be used for eMBB, etc.

FIG. 10 shows an exemplary NR slot structure with 15-kHz subcarrier spacing (e.g., µ=0 in Table 1). Within an NR slot, the PDCCH channels are confined to a particular number of symbols and a particular number of subcarriers, where this region is referred to as the control resource set (CORESET). In the exemplary structure shown in FIG. 10, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET is made up of multiple RBs (i.e., multiples of 12 REs) in the frequency domain and either one, two, or three OFDM symbols in the time domain, as further defined in 3GPP TS 38.211 § 7.3.2.2. A CORESET is functionally similar to the control region in LTE subframe, such as illustrated in FIG. 7. In NR, however, each REG consists of all 12 REs of one OFDM symbol in a RB, whereas an LTE REG includes only four REs, as illustrated in FIG. 7. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, so long as the same precoder used for the REGs by the transmitter. To assist the UE with channel estimation, the multiple REGs can be grouped together to form a REG bundle, and the REG bundle size for a CORESET can be indicated to the UE. The UE can assume that any precoder used for the transmission of the PDCCH is the same for all the REGs in the REG bundle. A REG bundle may consist of 2, 3, or 6 REGs.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. On the other hand, not using interleaving can be beneficial when available knowledge of the channel facilitates the use of a precoder in a particular part of the spectrum, thereby improving the SINR at the receiver.

Similar to LTE, NR data scheduling is done on a per-slot basis. In each slot, the base station (e.g., gNB) transmits downlink control information (DCI) over PDCCH that indicates which UE is scheduled to receive data in that slot, which RBs will carry that data. A UE first detects and decodes DCI and, if successful, then decodes the corresponding PDSCH based on the decoded DCI. Likewise, DCI can include UL grants that indicate which UE is scheduled to transmit data in that slot, which RBs will carry that data. A UE first detects and decodes an uplink grant from PDCCH and, if successful, then transmits the corresponding PUSCH on the resources indicated by the grant. DCI formats 0_0 and 0_1 are used to convey UL grants for PUSCH, while DCI formats 1_0 and 1_1 are used to convey PDSCH scheduling. Other DCI formats (2_0, 2_1, 2_2 and 2_3) are used for other purposes including transmission of slot format information, reserved resource, transmit power control information, etc. In addition to grants or assignments, DCI can also carry an indication of modulation and coding scheme (MCS) to be used for DL or UL transmissions.

Similarly, in NR, UCI (Uplink Control Information) is carried by PUCCH. UCI can include, but is not necessarily limited to, HARQ (Hybrid Automatic Repeat Request) feedback, CSI (Channel State Information), and SR (Scheduling Request). Currently there are five different PUCCH formats (0-4) defined for carrying different types of UCI, where the sizes of the various formats range from one to 14 OFDM symbols. The various PUCCH formats are further defined in 3GPP TS 38.211.

In general, a UE determines its frequency-domain RB assignment for PUSCH or PDSCH based on the resource allocation field in the detected DCI carried in PDCCH. In NR, two frequency resource allocation schemes, type 0 and type 1, are supported for PUSCH and PDSCH. The type to use for a particular PUSCH/PDSCH transmission can be defined by an RRC-configured parameter or indicated directly in the corresponding DCI or UL grant in RAR (for which type 1 is used). The RB indexing for uplink/downlink type 0 and type 1 resource allocation is determined within the UE's active carrier bandwidth part, and the UE shall (upon detection of PDCCH intended for the UE) determine first the uplink/downlink carrier bandwidth part and then the resource allocation within the carrier bandwidth part.

Monitoring and reception of PDCCH constitutes a large portion of a UE's total energy consumption. Typically, a UE is not scheduled in most PDCCH occasions that it monitors and, as such, the energy used for PDCCH reception does not contribute to useful data transfer. As such, it is desirable to minimize energy consumed for PDCCH monitoring and reception.

When an NR UE is in RRC_IDLE or RRC_INACTIVE, it must monitor PDCCH periodically to check for scheduling of paging requests to be subsequently transmitted on PDSCH. In between these monitoring occasions, the UE goes into deep sleep to reduce energy consumption. This sleep-wake cycle is known as "discontinuous reception" or DRX. The amount of UE power savings is related to wake period ("DRX ON") duration as a fraction of the entire DRX duty cycle.

In conventional LTE operation, the UE wakes up (e.g., enters DRX ON) a sufficient amount of time before the PDCCH reception occasion to receive a reference signal that allows the UE to tune and/or calibrate its receiver hardware in various ways. Such tuning and/or calibration can be used to address impairments or imperfections in the receiver hardware (e.g., inaccurate oscillator frequency or RF gain), operational changes in the receiver hardware (e.g., drift of frequency and/or gain vs. time or temperature), and environmental changes (e.g., change in signal level or Doppler frequency due to movement). Even so, reference signals and PDCCH occasions align relatively well in LTE, such that the UE's DRX ON duration remains small relative to the DRX duty cycle.

In NR, however, these reference signals do not always align with paging PDCCH occasions. In such cases, the UE may need to be awake a significant amount of time to receive both the reference signal and the subsequent PDCCH that may include paging information directed to the UE. This can increase the DRX ON duration as a fraction of the total DRX duty cycle, which leads to a very undesirable increase in UE energy consumption.

SUMMARY

Aspects are provided in the independent claims, and embodiments thereof are provided in the dependent claims.

Embodiments of the present disclosure provide specific improvements to communication between user equipment (UE) and network nodes in a wireless communication network, such as by facilitating solutions to the exemplary problems described above.

Some exemplary embodiments of the present disclosure include methods and/or procedures for calibrating a user equipment (UE) receiver during UE operation in a wireless network, according to various exemplary embodiments of the present disclosure. The exemplary method and/or procedure can be performed by a user equipment (UE, e.g., wireless device, IoT device, modem, etc. or component thereof) in communication with a network node (e.g., base station, gNB, en-gNB, etc., or component thereof) in the wireless network.

The exemplary method and/or procedure can include determining one or more calibration error thresholds for respective one or more parameters associated with the receiver. In various embodiments, the one or more parameters can be AGC-related parameters and/or AFC-related parameters.

The exemplary method and/or procedure can also include, for each of the one or more parameters, determining first and second parameter values based on receiving respective first and second reference signals from the wireless network. In some embodiments, the first and second reference signals can be respective synchronization signal and PBCCH blocks (SSBs) that are transmitted sequentially, but not necessarily consecutively, in time. In other words, the first and second SSBs may or may not be separated by an intervening SSB transmitted by the wireless network.

The exemplary method and/or procedure can also include, for each of the one or more parameters, determining a difference between the first and second parameter values. The exemplary method and/or procedure can also include selectively receiving a third reference signal from the wireless network based on the determined differences and the calibration error thresholds. The third reference signal can be transmitted/received after the second reference signal. Moreover, the third reference signal can be the nearest preceding reference signal to a physical downlink channel reception occasion for the UE. Put a different way, there are no intervening reference signals between the third reference signal and the physical downlink channel reception occasion. For example, in case the third reference signal is a third SSB, it can be the SSB that is closest in time (but before) the UE's PDCCH reception occasion, e.g., for scheduling of paging information.

In some embodiments selectively receiving a third reference signal can include comparing each determined difference to a corresponding calibration error threshold. In such embodiments, selectively receiving a third reference signal can also include exiting low-power operation and receiving the third reference signal based on at least one determined difference being greater than the corresponding calibration error threshold. In such embodiments, selectively receiving a third reference signal can also include remaining in low-power operation and foregoing reception of the third reference signal based all determined differences being less than or equal to the corresponding calibration error thresholds.

Other exemplary embodiments include user equipment (e.g., UE, wireless devices, IoT devices, or components thereof, such as a modem) configured to perform operations corresponding to various ones of the exemplary methods and/or procedures described above. Other exemplary embodiments include non-transitory, computer-readable media storing program instructions that, when executed by at least one processor, configure such network nodes or such UEs to perform operations corresponding to the exemplary methods and/or procedures described above.

These and other objects, features and advantages of the exemplary embodiments of the present disclosure will become apparent upon reading the following detailed description of the exemplary embodiments of the present disclosure.

DETAILED DESCRIPTION

As briefly mentioned above, NR reference signals usable for UE receiver tuning and/or calibration do not always align with paging PDCCH occasions. In such cases, the UE may need to be awake a significant amount of time to receive both the reference signal and the subsequent PDCCH that may include paging information directed to the UE. This can increase the DRX ON duration as a fraction of the total DRX duty cycle, which leads to a very undesirable increase in UE energy consumption. These issues are discussed in more detail below.

In June 2018, 3GPP has started a new study-item titled "User-Equipment (UE) Power Savings for NR." One of the objectives of this study item is to assess the energy consumption of a UE operating in a NR network. Specifically, from a PHY perspective, the goal is to analyze the various layer-1 (L1) features that can result in increased UE energy consumption, and to propose solutions to reduce such energy consumption. Note that the terms "energy consumption" and "power consumption" are used interchangeably herein with the understanding that power is energy per unit time.

One promising area for achieving improvements in UE power consumption is in the UE monitoring of the PDCCH. As mentioned above, PDCCH carries control information from network to UE, including system information, downlink scheduling grants, uplink scheduling grants, downlink/uplink resources for UE to use, slot formats, etc. The UE energy consumption during PDCCH monitoring can be divided primarily into baseband energy consumption and analog/radio-frequency (RF) energy consumption.

This division can be further illustrated by reference to FIG. 11, which is a block diagram of an exemplary LTE and/or NR radio frequency (RF) receiver for a user equipment (UE), according to one or more exemplary embodiments of the present disclosure. The exemplary RF receiver shown in FIG. 11 can be included, as appropriate, in any UEs described herein.

Figure 8:
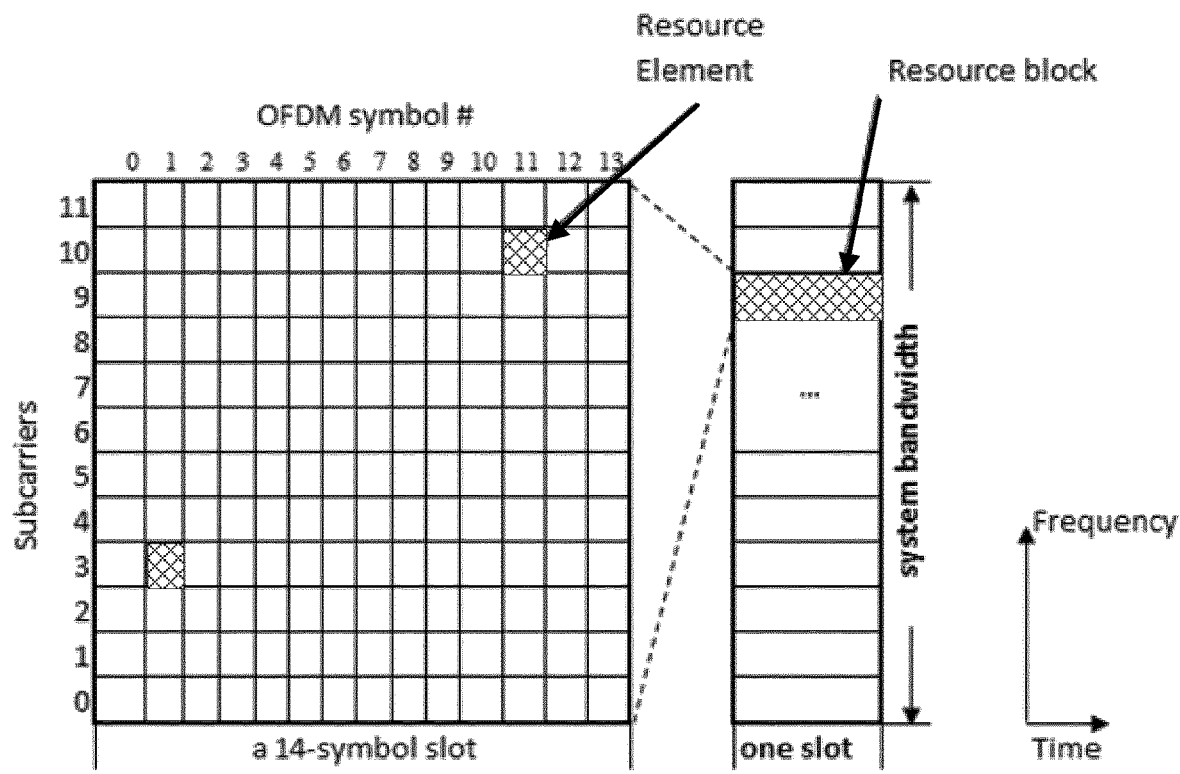
FIG. 8 shows an exemplary time-frequency resource grid for an NR slot.
Figure 9:
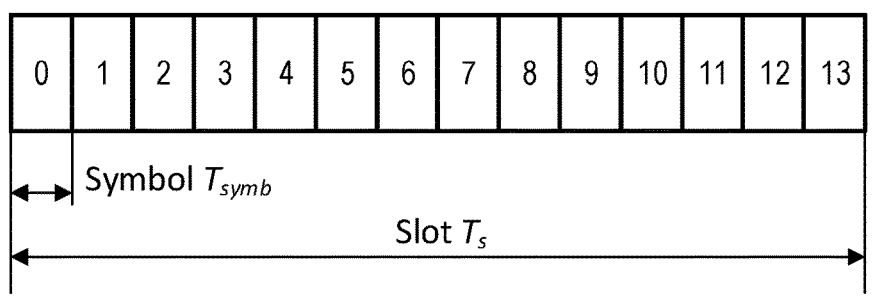
FIG. 9 shows an exemplary NR slot configuration of 14 OFDM symbols.
Figure 10:
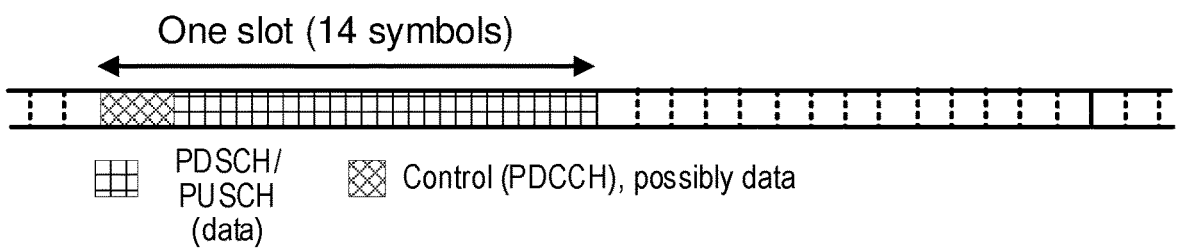
FIG. 10 shows an exemplary two-symbol NR minislot.

As shown in FIG. 8, an RF signal (e.g., a signal from an LTE eNB or an NR gNB) is picked up by an antenna, passed through an RF filter, and amplified by a low-noise amplifier (LNA). The LNA and RF filter can be part of RF front end 710. The LNA output is passed through a mixer which translates (or demodulates) the signal down to baseband, the mixer also being controlled by a local oscillator (LO). The demodulated signal is passed through a second filter that suppresses demodulation products other than the desired baseband signal. The filtered baseband signal is passed through a variable gain amplifier (VGA) that adjusts the amplitude of the signal to be within a suitable range for sampling and analog-to-digital conversion carried out by the analog-to-digital converter (ADC). The LO, mixer, second filter, VGA, AGC, and ADC can be part of RF receiver 720.

The LNA and VGA can be controlled by automatic gain control (AGC) functionality that can reside partly in RF receiver 720 and partly in a baseband circuit 730 that is coupled to the RF receiver. In some embodiments, the frequency of the LO can also be controlled by automatic frequency control (AFC) functionality that can reside partly in RF receiver 720 and partly in baseband circuit 730. The baseband circuit can be, e.g., a digital or mixed-signal baseband application-specific integrated circuit (ASIC).

Examples of AGC-related functionality in the RF receiver include power detection and clipping/saturation detection. Examples of AGC-related functionality in the baseband circuit include reference signal (RS) received power (RSRP) detection. In exemplary configurations, the LNA can utilize two or three operating points, each suitable for a particular received signal power range based on a particular gain setting. In case of two operating points, the operating points (or gain settings) can be referred to as high gain and low gain. In case of three operating points, they can be referred to as high gain, mid gain, and low gain, respectively.

When the received signal power range is unknown, the UE can check available gain settings systematically until it detects there is significant received power after the ADC, but without saturation. Detection of saturation can indicate that the LNA is providing too much gain, and an operating point with lower gain can be selected. On the other hand, if it is detected that the signal is too low after the ADC, an operating point with higher gain can be selected. This gain search preferably is carried out when it is known that there are signals present; otherwise, the LNA may be configured with too high gain and once received signals are present, their overamplification can result in clipping and/or saturation, signal distortion, and loss of information.

Figure 11:
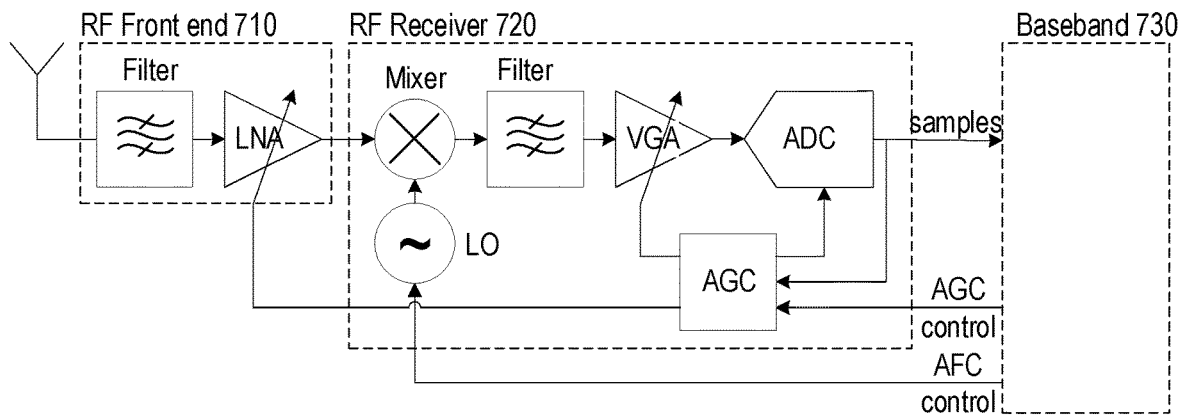
FIG. 11 is a block diagram of an exemplary LTE and/or NR radio frequency (RF) receiver for a user equipment (UE), according to various exemplary embodiments of the present disclosure.

In the context of the exemplary receiver shown in FIG. 11, baseband energy consumption can include the PDCCH-related operations performed by baseband processor 730. Likewise, RF energy consumption can include all RF processing required for the reception of the PDCCH signal in the UE device, such as performed by RF front end 710 and RF receiver 720.

A UE can perform periodic cell search and measurements of signal power and quality (e.g., reference signal received power, RSRP, and Reference signal received quality, RSRQ) in both Connected and Idle modes. The UE is responsible for detecting new neighbor cells, and for tracking and monitoring already detected cells. The detected cells and the associated measurement values are reported to the network. An LTE UE can perform such measurements on various downlink reference signals (RS) including, e.g., cell-specific Reference Signal (CRS), MBSFN reference signals, UE-specific Reference Signal (DM-RS) associated with PDSCH, Demodulation Reference Signal (DM-RS) associated with EPDCCH or MPDCCH, Positioning Reference Signal (PRS), and CSI Reference Signal (CSI-RS).

Figure 12:
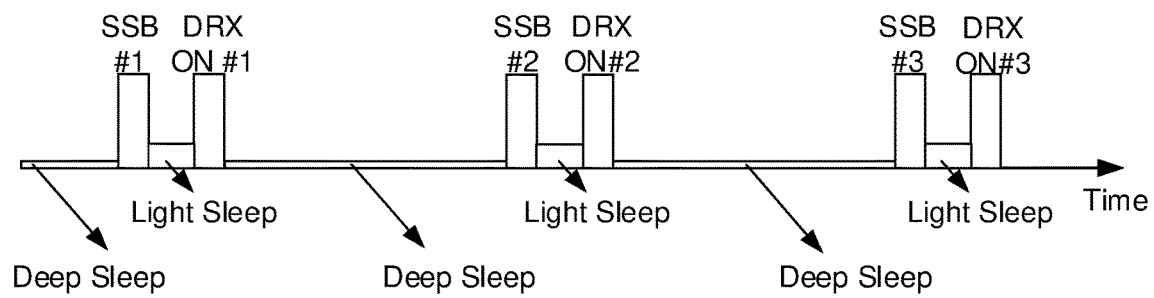
FIG. 12 is a diagram showing activities at a UE according to a traditional approach.

FIG. 12 is a diagram showing activities at a UE according to a traditional approach for performing synchronization and receiving messages, e.g. control plane messages. The diagram is a timing diagram where the activity is represented schematically by energy consumption of the activity in the second axis. Describing the activities as occurring in time, i.e. starting from left, the UE is in a deep sleep mode where some circuitry is switched off or in a low-power mode. At occurrence of a synchronization or reference block, the receiver wakes up and receives e.g. primary and secondary synchronization signals and a physical broadcast channel. Based on achieved information on e.g. signal strength, accurate timing, and accurate frequency, the UE calibrates parameters, e.g. automatic gain settings and oscillator trim. The UE can then put receiver circuitry etc. in a light sleep mode until a message occasion where it receives a message, e.g. comprising control information. The UE can then return to deep sleep mode until the same procedure is repeated, after which the UE again returns to deep sleep mode.

Figure 13:
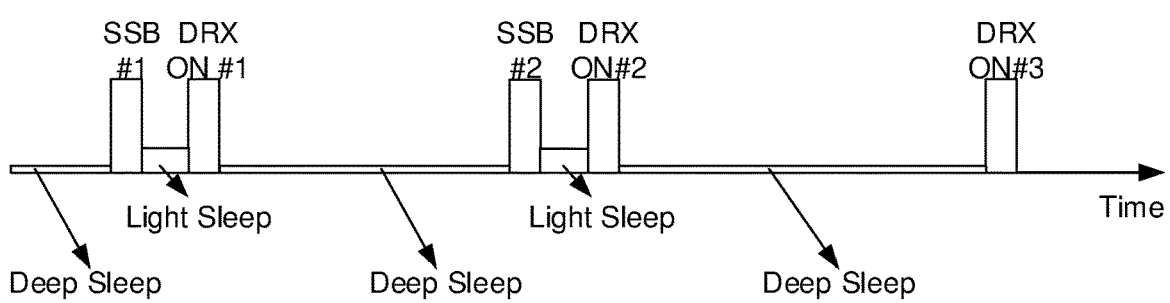
FIG. 13 is a diagram showing activities at the UE applying the power-saving approach demonstrated according to some embodiments.

FIG. 13 is a diagram showing activities at the UE applying the power-saving approach demonstrated according to some embodiments. The diagram is based on a similar scenario as of FIG. 12 and shows activity in a similar way. As is shown in FIG. 12, also here the UE is in a deep sleep mode where some circuitry is switched off or in a low-power mode. At occurrence of a synchronization or reference block, the receiver wakes up and receives e.g. primary and secondary synchronization signals and a physical broadcast channel. Based on achieved information on e.g. signal strength, accurate timing, and accurate frequency, the UE calibrates parameters, e.g. automatic gain settings for the AGC and oscillator trim for the AFC. The UE can then put receiver circuitry etc. in a light sleep mode until a message occasion where it receives a message, e.g. comprising control information. The UE can then return to deep sleep mode until the same procedure is repeated. Here, in this approach the UE checks whether the reception conditions have changed significantly, i.e. whether AGC and/or AFC settings need to be changed above a first threshold. If no significant change is needed, the UE determines to omit receiving a coming synchronization or reference block to save power and only wakes up to receive a coming message.

Figure 14:
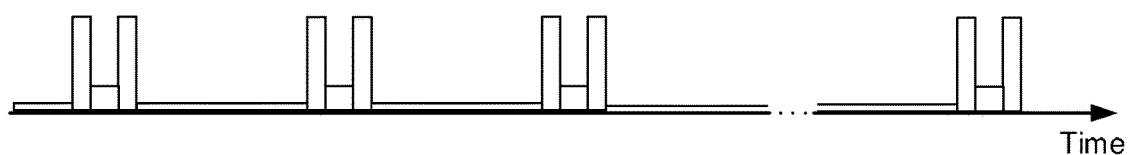
FIGS. 14 and 15 are diagrams corresponding to FIGS. 12 and 13, respectively, showing power-saving approaches in FIG. 15 according to some embodiments.
Figure 15:
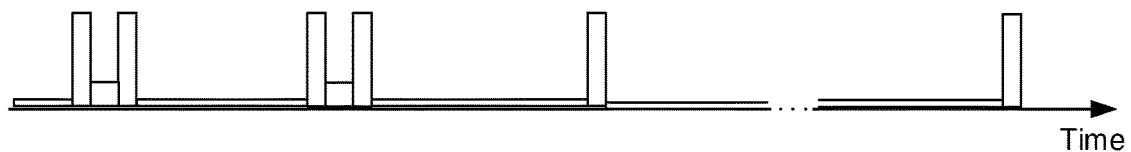

FIGS. 14 and 15 are diagrams corresponding to FIGS. 12 and 13, respectively, showing power-saving approaches in FIG. 15 according to some embodiments. FIG. 14 shows the same principle as FIG. 12 but for a longer time. FIG. 15 shows the activities of the UE for a similar scenario but where the power saving approaches according to embodiments are applied. That is, when the UE has determined that no significant change of for example AGC and/or AFC is needed, the synchronization or reference block reception is omitted and a coming message is received, wherein the UE can be in deep sleep until the message occasion. After receiving the message, the UE returns to deep sleep, and also omits receiving a next coming synchronization or reference signal and remains in deep sleep until a next message occasion, where that message is received. This low-power approach may for example be applied as long as the reception of coming messages works fine, and if it does not. the UE returns to reading the synchronization or reference signals.

It should be noted that upon determining that reception parameters need not be changed significantly, the UE may decide not to omit reception of next synchronization or reference signals if it is also determined that the reception conditions are tough, e.g. below a second threshold. In such case, the UE may determine to receive the next synchronization or reference signal block although the first and second receptions had similar conditions.

Figure 16:
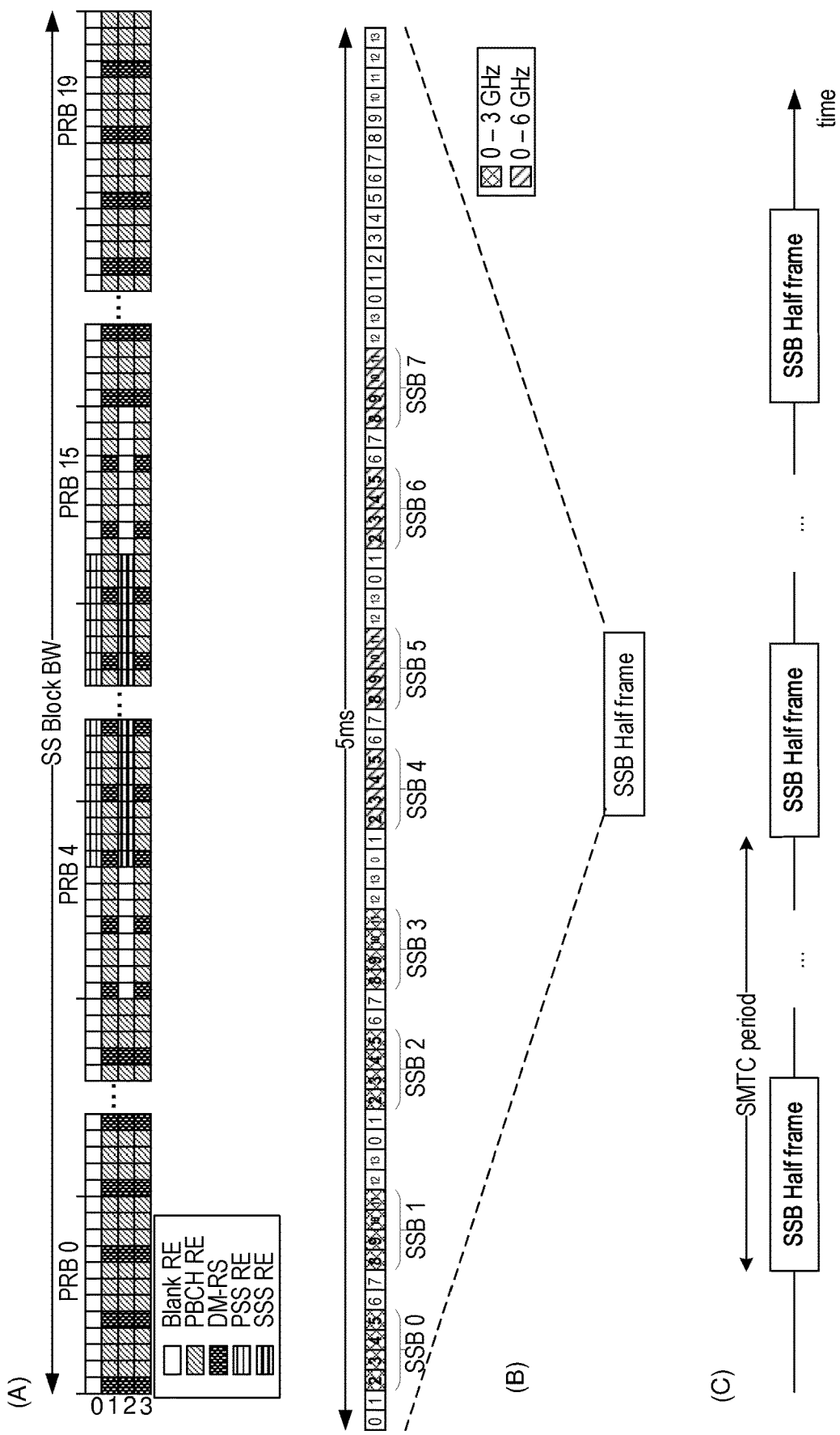
FIG. 16 shows various exemplary time-frequency configurations of NR SS/PBCH blocks (SSBs) usable with various exemplary embodiments of the present disclosure.

In NR, downlink synchronization signal and PBCH blocks (SSBs) are used for UE measurement and calibration. An exemplary NR SSB configuration is illustrated in FIG. 8A. The SSB comprises a Primary Synchronization Signal (PSS), a Secondary Synchronization Signal (SSS), a Physical Broadcast Channel (PBCH), and Demodulation Reference Symbols (DM-RS). As also shown in FIG. 16, part (A), an individual SSB spans four adjacent OFDM symbols within a PRB. Multiple SSBs comprise an SSB burst, which is transmitted within a half-frame (e.g., 5 ms). Moreover, within the half-frame, multiple SSBs for different cells or different beams may be transmitted, as illustrated with SSB indices 0-7 in FIG. 16, part (B). The number of SSB locations in a burst depends on the frequency range (e.g., 0-3 or 0-6 GHz as shown in FIG. 16, part (B),), as well as on the particular NR radio interface configuration. The SSB burst (hence the individual SSBs) are transmitted according to an SSB measurement timing configuration (SMTC) cycle, which may be 5, 10, 20, 40, 80 or 160 ms, as illustrated in FIG. 16, part (C).

In NR, SSBs can occur much more sparsely, or over a longer time period, than in corresponding reference signals in LTE. Accordingly, the UE is provided with assistance information that allows it to search in a narrower time window for the signals of interest. This time window is denoted by SMTC. A UE can be configured by a network node (e.g., eNB, gNB, or base station) with an SMTC window (or "SMTC" for short) for each NR carrier to be measured. The SMTC can include parameters such as, e.g., periodicity, duration, and time offset. The SMTC time offset can be expressed as a number of subframes, each of length 1 ms, within the range 0 to SMTC period-1, and uses the frame border of system frame number 0 of the serving cell as reference.

The UE is not expected to search for, or measure, SSBs outside of the indicated SMTC window(s). For inter-frequency measurements, an SMTC is indicated per frequency layer, while for intra-frequency layer, two SMTCs may be indicated, such as a first SMTC which may be considered to be a default SMTC, and a second SMTC associated with a list of physical cell IDs (PCI) to which the second SMTC applies. The first and second SMTC for intra-frequency measurements differ only by SMTC periodicity.

SSB measurements can be identified as intra- or inter-frequency. An SSB-based measurement is referred to as intra-frequency if: 1) the carrier center frequency of the SSB of the serving cell indicated for measurement and the carrier center frequency of the SSB of the neighbor cell are the same; and 2) the subcarrier spacing of the two SSB are also the same. A UE can perform intra-frequency SSB based measurements without measurement gaps if the following conditions are met: 1) the SSB is completely contained in the downlink operating bandwidth of the UE, and 2) the SSB has the same subcarrier spacing as the downlink data transmission to the UE.

As described above, an LTE or NR receiver utilizes AGC to optimize the available resolution of the ADC and any signal processing functions in the receive chain. In addition, the UE also needs Automatic Frequency Correction (AFC) to synchronize its frequency to the network, thereby avoiding interference among sub-carriers in an OFDM symbol. NR UEs utilize SSB measurements for both AGC and AFC.

When an NR UE is in RRC_IDLE or RRC_INACTIVE, it monitors PDCCH periodically for scheduling of paging requests to be subsequently transmitted on PDSCH. In between these monitoring occasions, the UE typically goes into deep sleep to reduce energy consumption. This sleep-wake cycle is known as "discontinuous reception" or DRX. The amount of UE power savings is related to wake period ("DRX ON") duration as a fraction of the entire DRX duty cycle.

Before an NR UE receives and decodes PDCCH for possible paging scheduling, the UE must tune and/or calibrate its receive chain by performing AGC and AFC based on a received SSB. However, in 3GPP Rel-15, SSB is not always in line with PDCCH reception occasions. In other words, the SSB closest in time to the PDCCH occasion may not be within the UE's normal and/or desired DRX ON duration for that PDCCH occasion. As such, the UE will need to wake up before the DRX ON duration to perform AGC/AFC based on SSB, and either stay awake or return to a "light sleep" until the PDCCH occasion in order to maintain the timing and frequency references calibrated by AFC. In either case, early wake up (i.e., ahead of DRX ON) to use the previous SSB for AGC/AFC calibration leads to a higher UE energy consumption and shortens the UE's battery life.

One proposal to reduce the light-sleep operation between the early SSB and normal DRX ON is for the network to broadcast extra reference signals to assist UE AGC/AFC. However, this solution adds complexity to both the network and the UE, and also requires the UE to expend additional energy receiving the proposed reference signals. Accordingly, there is a need for a technique that reduces and/or minimizes the amount of time the UE spends awake or in light speed between SSB and PDCCH reception, without corresponding increases in UE/network complexity and/or energy consumption.

Exemplary embodiments of the present disclosure can address these and other issues, problems, and/or difficulties by providing a flexible mechanism for a UE to selectively omit early SSB reception and AGC/AFC calibration based on observations about whether previous SSB-based AGC/AFC calibrations have resulted in significant corrections. For example, the UE can maintain one or more receiver adjustments and/or settings (e.g., RF gains for AGC, frequency errors or corrections for AFC, etc.) determined based on a series of SSB reception occasions. If the difference between consecutive receiver adjustments and/or settings (e.g., consecutive RF gains for AGC, consecutive frequency errors for AFC) are reliably below a certain threshold, the UE can omit early SSB reception for AGC/AFC calibration and remain in deep sleep until the beginning of the DRX ON duration or another activity. Otherwise, if the difference between consecutive receiver adjustments and/or settings is above the threshold, UE wakes up for early SSB reception and performs AGC/AFC calibration accordingly. In this manner, embodiments can facilitate reduction in UE energy consumption in RRC_IDLE or RRC_INACTIVE modes by avoiding unnecessary instances of early SSB reception and AGC/AFC calibration when there is no significant change of RF gain and/or frequency error.

Although embodiments are primarily described based on PDCCH monitoring for paging information, the principles are equally applicable to other scenarios involving UE idle or inactive operation. For example, similar techniques can be employed for ON-duration monitoring, paging and/or system information (SI) monitoring, mobility or other measurements, etc. Furthermore, although embodiments are described in relation to the goal of avoiding early wake-up for SSB, the principles are equally applicable to reducing the occurrence of other tuning updates. In this manner, such techniques can facilitate lower UE energy consumption without compromising PDCCH reception performance or requiring additional network resources.

Figure 17:
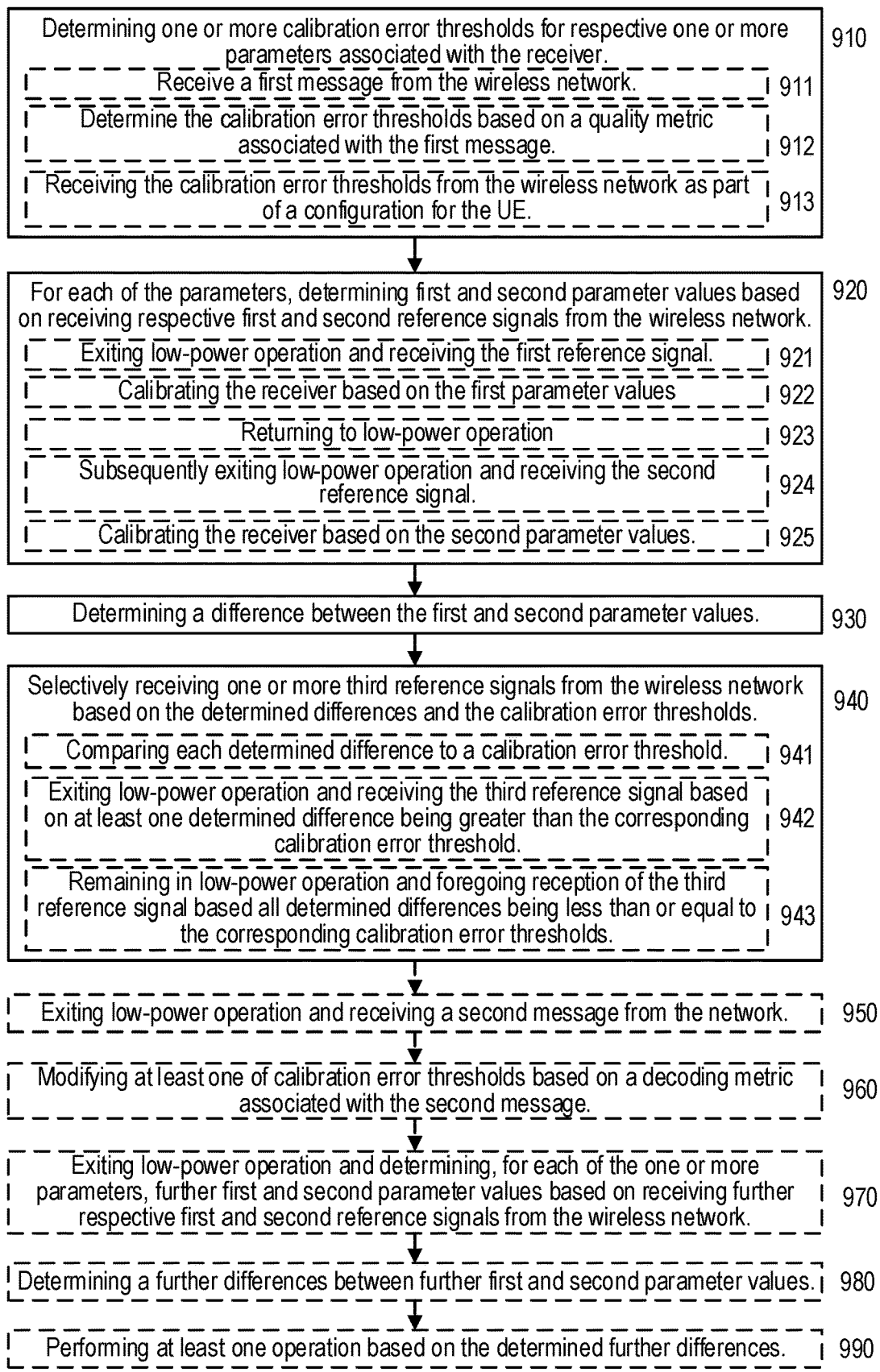
FIG. 17 shows a flow diagram of an exemplary method and/or procedure performed by a user equipment (UE, e.g., wireless device, IoT device, etc.), according to various exemplary embodiments of the present disclosure.

FIG. 17 shows a flow diagram of an exemplary method and/or procedure for calibrating a user equipment (UE) receiver during UE operation in a wireless network, according to various exemplary embodiments of the present disclosure. The exemplary method and/or procedure can be performed by a user equipment (UE, e.g., wireless device, IoT device, modem, etc. or component thereof) in communication with a network node (e.g., base station, gNB, en-gNB, etc., or component thereof). For example, the exemplary method and/or procedure shown in FIG. 17 can be implemented in a UE or wireless device configured according to other figures described herein. Although FIG. 17 shows blocks in a particular order, this order is merely exemplary, and the operations of the exemplary method and/or procedure can be performed in a different order than shown and can be combined and/or divided into blocks having different functionality than shown. Optional blocks or operations are indicated by dashed lines.

The exemplary method and/or procedure can include the operations of block 910, where the UE can determine one or more calibration error thresholds for respective one or more parameters associated with the receiver. In various embodiments, the one or more parameters can be AGC-related parameters and/or AFC-related parameters. In more detail, the AGC-related parameters can include respective gains for one or more components in the receive chain (e.g., such as shown in FIG. 11). Likewise, the AFC-related parameters can include frequency error of the LO (e.g., such as shown in FIG. 11).

In some embodiments, a UE can determine the threshold(s) from production/field test or simulation in different channel conditions. The threshold(s) can be stored in a memory and maintained during UE deep sleep.

In some embodiments, the operations of block 910 can include the operations of sub-block 911, where the UE can receive a first message from the wireless network. For example, the first message can be a PDCCH message with paging information related to the UE (e.g., scheduling information for a paging message that will be transmitted on PDSCH). Such embodiments can also include the operations of sub-block 912, where the UE can determine the one or more calibration error thresholds based on a quality metric associated with the first message. For example, the threshold(s) can depend on a measured SINR or other similar quality metric.

As mentioned above, the network (e.g., gNB) usually configures the PDCCH paging message with a high AL for robustness and reliability. For example, if SSB measurement skipping is related to paging in RRC_IDLE or RRC_Inactive modes, and the received SINR is high, the UE can consider larger threshold(s) with respect to the case where the SINR is low. Furthermore, the UE can produce a lookup table (LUT) for different channel/signal quality measurements and the related threshold values. For example, the UE can configure threshold(s) for very low SINR values such that wakeup for receiver calibration is nearly always performed.

In some embodiments, the operations of block 910 can include the operations of sub-block 913, where the UE can receive the calibration error thresholds from the network, e.g., as part of a configuration. In some embodiments, such a configuration can also include a reference signal skipping pattern.

The exemplary method and/or procedure can also include the operations of block 920, where the UE can, for each of the one or more parameters, determine first and second parameter values based on receiving respective first and second reference signals from the wireless network. In some embodiments, the first and second reference signals can be respective synchronization signal and PBCCH blocks (SSBs) that are transmitted sequentially, but not necessarily consecutively, in time. In other words, the first and second SSBs may or may not be separated by an intervening SSB transmitted by the wireless network. Although the following explanation refers to SSBs, it should be understood that SSBs are merely examples, and that other types of reference signals can be utilized in the exemplary method and/or procedure.

In some embodiments, the operations of block 920 can include the operations of sub-block 921, where the UE can exit low-power operation and receive the first reference signal (e.g., SSB). For example, low-power operation can involve and/or be based on deep sleep operation, whereby most of the UE's circuits are powered off. Such deep sleep operation can be part of the UE's operation during idle mode and/or inactive mode. Such embodiments can also include the operations of sub-block 922, where the UE can calibrate the receiver based on the first parameter values, and sub-block 923, where the UE can return to low-power operation. In various embodiments, calibrating the receiver based on the first parameter values can include performing one or more of the following operations: automatic gain control (AGC) and automatic frequency control (AFC).

For example, the UE can exit deep sleep, receive an SSB, and perform AGC/AFC calibration of the receiver. For AGC, the power of IQ signal can be measured and the receiver gain(s) can be searched in a look-up table. For AFC, the frequency error can be calculated by measuring the phase change between Primary Synchronization Signal (PSS) and SSS (Secondary Synchronization Signal) which are known after a cell search has been made. The receiver gain(s) from AGC and/or the frequency error from AFC can be stored to a memory. The UE then returns to deep sleep, during which the non-volatile memory will retain the stored values.

In some embodiments, the operations of block 920 can include the operations of sub-block 924, where the UE can subsequently exit low-power operation and receive the second reference signal (e.g., SSB). Such embodiments can also include the operations of sub-block 925, where the UE can calibrate the receiver based on the second parameter values. The operations of sub-blocks 924-925 can be substantially similar to the operations of sub-blocks 921-922, described above.

The exemplary method and/or procedure can also include the operations of block 930, where the UE can, for each of the one or more parameters, determine a difference between the first and second parameter values. For example, the UE can calculate the difference between the receiver gain(s) determined based on the first SSB, and the receiver gain(s) determined based on the second SSB. Likewise, the UE can calculate the difference between the frequency error determined based on the first SSB, and the frequency error determined based on the second SSB.

The exemplary method and/or procedure can also include the operations of block 940, where the UE can selectively receive a third reference signal from the wireless network based on the determined differences and the calibration error thresholds. The third reference signal can be transmitted/received after the second reference signal. Moreover, the third reference signal can be the nearest preceding reference signal to a physical downlink channel reception occasion for the UE. Put a different way, there are no intervening reference signals between the third reference signal and the physical downlink channel reception occasion. For example, in case the third reference signal is a third SSB, it can be the SSB that is closest in time (but before) the UE's PDCCH reception occasion, e.g., for scheduling of paging information.

In some embodiments, the operations of block 940 can include the operations of sub-block 941, where the UE can compare each determined difference to a corresponding calibration error threshold. In such embodiments, the operations of block 940 can include the operations of sub-block 942, where the UE can exit low-power operation (e.g., deep sleep during idle or inactive mode operation) and receive the third reference signal based on at least one determined difference being greater than the corresponding calibration error threshold. In some embodiments, the operations of block 940 can also include the operations of sub-block 943, where the UE can remain in low-power operation and forego reception of the third reference signal based all determined differences being less than or equal to the corresponding calibration error thresholds.

By way of example, the UE can compare a receiver gain(s) difference determined in block 930 to the corresponding receiver gain(s) threshold determined in block 910. Similarly, the UE can compare a frequency error difference determined in block 930 to the corresponding frequency error threshold determined in block 910. If all the differences are less than their corresponding thresholds, the UE can forego and/or omit the next coming SSB, or an SSB occasion preceding the PDCCH paging occasion, and remain in low-power operation until the coming PDCCH paging occasion. Otherwise, the UE can schedule a wakeup for the next coming SSB, or an SSB occasion preceding the PDCCH paging occasion, to receive the SSB and perform the receiver calibration.

In other embodiments, some, but not necessarily all, of the compared differences need to be less than their corresponding thresholds for the UE to decide to remain in low-power operation rather than scheduling a wakeup for calibration based on SSB reception.

In some embodiments, operations of blocks 920-930 can be performed occasionally or periodically during UE operation, using available reference signal (e.g., SSB) reception occasions, independent of the selective reception of the third reference signal (e.g., the closest preceding SSB to a PDCCH reception occasion). The parameter differences observed between tuning occasions can used to determine whether the current calibration error thresholds are suitable, or whether they should be modified and/or adapted.

In some embodiments, the exemplary method and/or procedure can also include the operations of block 950, where the UE can exit low-power operation and receive a second message from the wireless network. For example, the second message can be a PDCCH message with paging information related to the UE (e.g., scheduling information for a paging message that will be transmitted on PDSCH).

In such embodiments, the exemplary method and/or procedure can also include the operations of block 960, where the UE can modify at least one of calibration error thresholds based on a decoding metric associated with the second message.

For example, the UE can adjust at least one of the calibration error thresholds based on paging reception and/or decoding success. More specifically, if the observed paging decoding quality metrics are much better than a predetermined (e.g., standardized) quality metric threshold, then the UE can increase the calibration error thresholds. In general, this will cause the UE to more frequently remain in low-power operation and forego SSB reception, thereby reducing energy consumption while maintaining compliance with any specified paging decoding requirements.

In some embodiments, the exemplary method and/or procedure can also include the operations of block 970, where the UE can exit low-power operation and determine, for each of the one or more parameters, further first and second parameter values based on receiving further respective first and second reference signals from the wireless network. For example, further respective first and second reference signals can be SSBs. In such embodiments, the exemplary method and/or procedure can also include the operations of block 980, where the UE can, for each of the one or more parameters, determine a further difference between the further first and second parameter values. In such embodiments, the exemplary method and/or procedure can also include the operations of block 990, where the UE can perform at least one of the following operations based on the determined further differences: modifying at least one of the calibration error thresholds; and increasing or decreasing the number of third reference signals that are subject to selective reception.

For example, a UE operating in a configuration where SSB measurements are omitted or early wake-up is disabled may occasionally perform early wake-ups in order to determine a difference between consecutive tuning operation results. If larger differences are detected, the omission configuration may be changed to full measurement/tuning configuration. Likewise, if smaller differences are detected, the UE can adjust operation to more frequently remain in low-power operation and forego SSB reception. These adjustments can be performed in various ways, including modifying the calibration error thresholds and/or explicitly changing the number of SSBs that are skipped by the UE. For example, the UE can adjust operation to forego reception of all SSBs except the ones that are closest in time to the respective PDCCH reception occasions.

To make the exemplary method and/or procedure robust to sudden channel condition changes, the UE can consider additional measures. For example, the UE can always wakes up for the latest possible SSB measurements, or the UE can ignore some of the SSB skipping occasions if the UE expects a sudden change in channel conditions (e.g., when the UE is moving faster than typical pedestrian speed) or when the UE is at a cell edge. Furthermore, the UE can decide to forego SSB reception in some but not all DRX cycles. Additionally, the UC can adjust calibration error thresholds and number of SSB skipping occasions based on the length of sleep. For example, if the DRX cycle is short the threshold may be higher, and if long lower, or vice versa. The UE can also adjust calibration error thresholds during each selective reception of an SSB. For example, the threshold(s) may be set to higher values for the first ones and lower in the later ones, or vice versa.

Although the above description focuses on techniques used when the UE is operating in RRC_Idle or RRC_Inactive mode, the underlying principles can also be applied during operation in RRC_Connected mode when the UE is configured with DRX. In such scenarios, the UE can often receive a wake-up signal (WUS) prior to a scheduled DRX ON duration that indicates whether or not the UE should actually wake up for the schedule DRX ON duration. In such case, the UE may need to wake-up before the WUS reception occasion to perform AGC/AFC and, consequently, will not enjoy a full deep sleep.

In these scenarios, the UE can wake-up one, two, or more SSB occasions before WUS, and if the channel conditions are good, return to low-power operation until the WUS reception occasion. For the specific case of WUS reception, particularly if the WUS itself is based on (or includes) some reference signal (such as DMRS), the UE can use those reference signals for AGC/AFC as well.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 18:
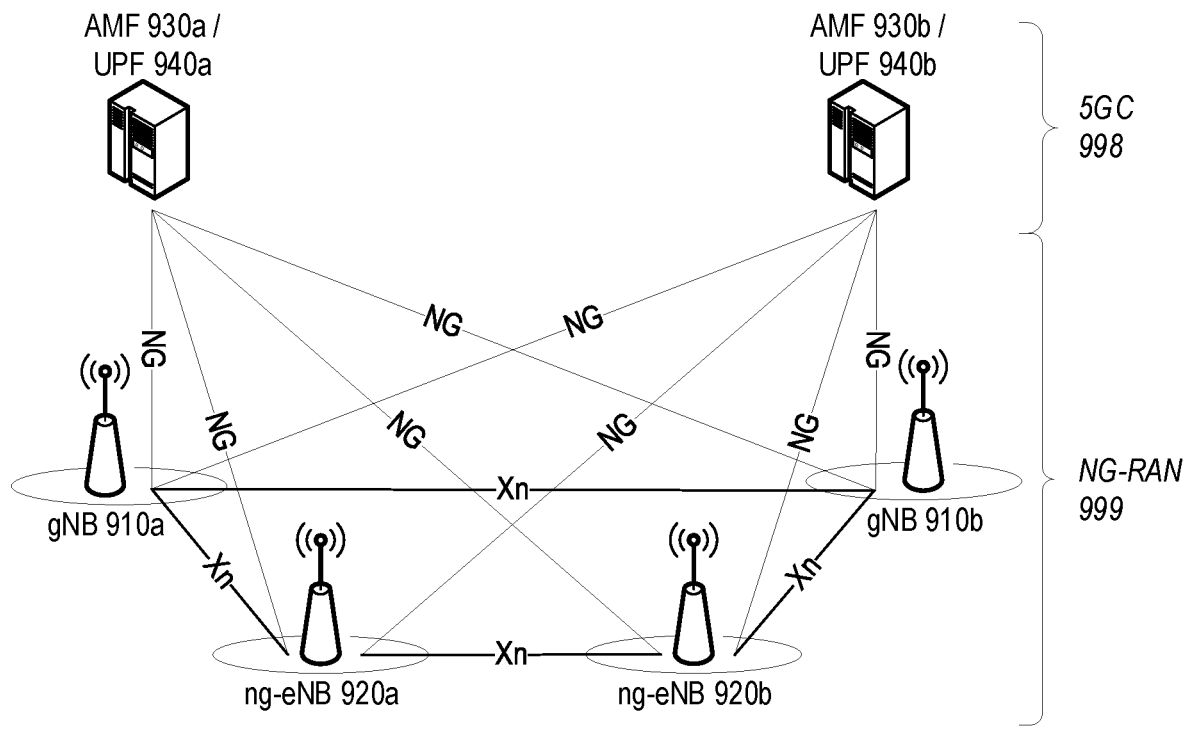
FIG. 18 shows a high-level view of an exemplary 5G network architecture, including a Next Generation Radio Access Network (NG-RAN) and a 5G Core (5GC), according to various exemplary embodiments of the present disclosure.

FIG. 18 shows a high-level view of an exemplary 5G network architecture, including a Next Generation Radio Access Network (NG-RAN) 1099 and a 5G Core (5GC) 1098. As shown in the figure, NG-RAN 1099 can include gNBs 1010 (e.g., 1010a,b) and ng-eNBs 1020 (e.g., 1020a,b) that are interconnected with each other via respective Xn interfaces. The gNBs and ng-eNBs are also connected via the NG interfaces to 5GC 1098, more specifically to the AMF (Access and Mobility Management Function) 1030 (e.g., AMFs 1030a,b) via respective NG-C interfaces and to the UPF (User Plane Function) 1040 (e.g., UPFs 1040a,b) via respective NG-U interfaces.

NG-RAN 1099 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

Figure 1:
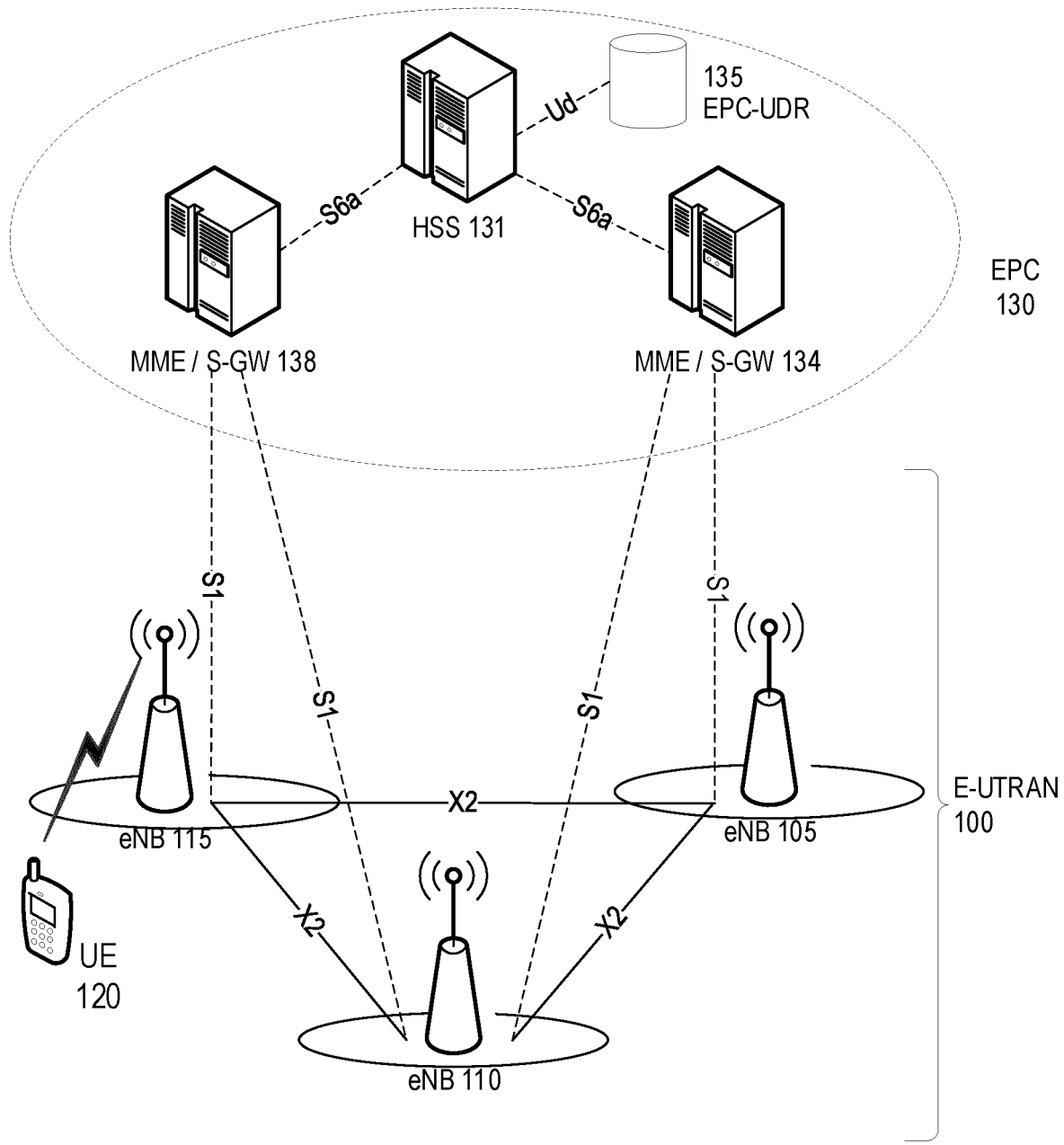
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2:
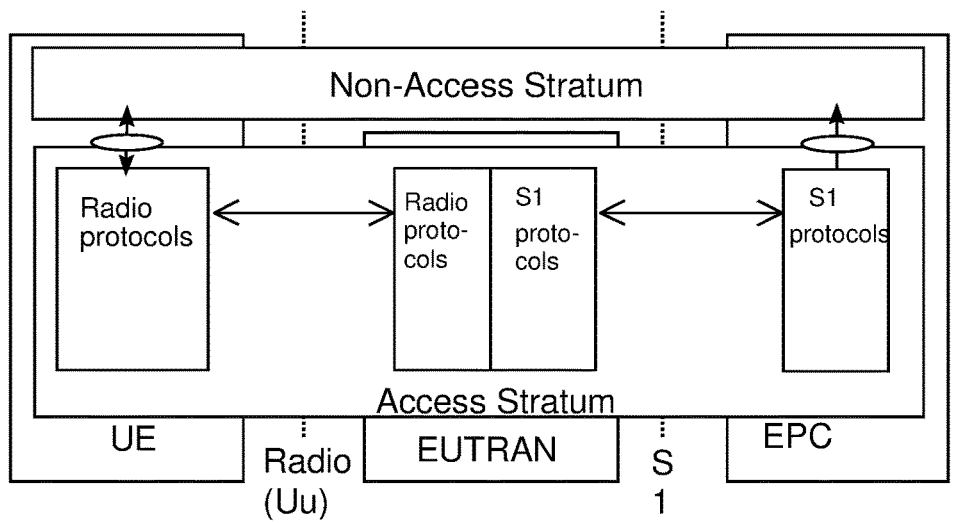
FIG. 2 is a high-level block diagram of an exemplary E-UTRAN architecture in terms of its constituent components, protocols, and interfaces.
Figure 3:
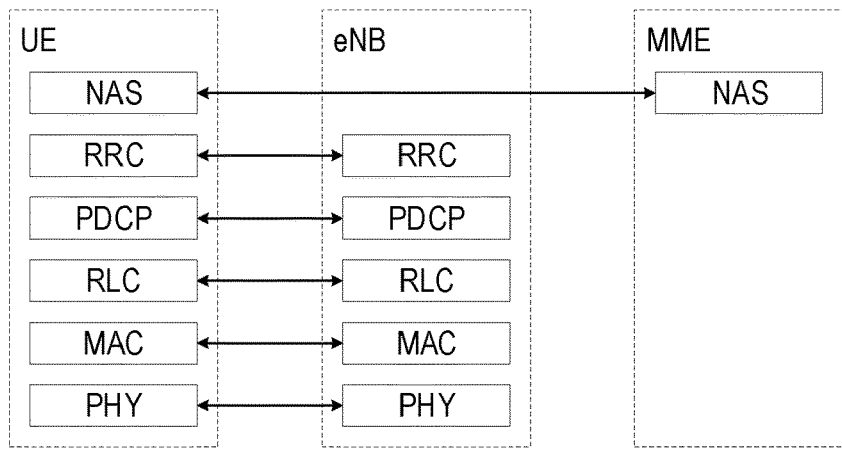
FIG. 3 is a block diagram of exemplary protocol layers of the control-plane portion of the radio (Uu) interface between a user equipment (UE) and the E-UTRAN.
Figure 4:
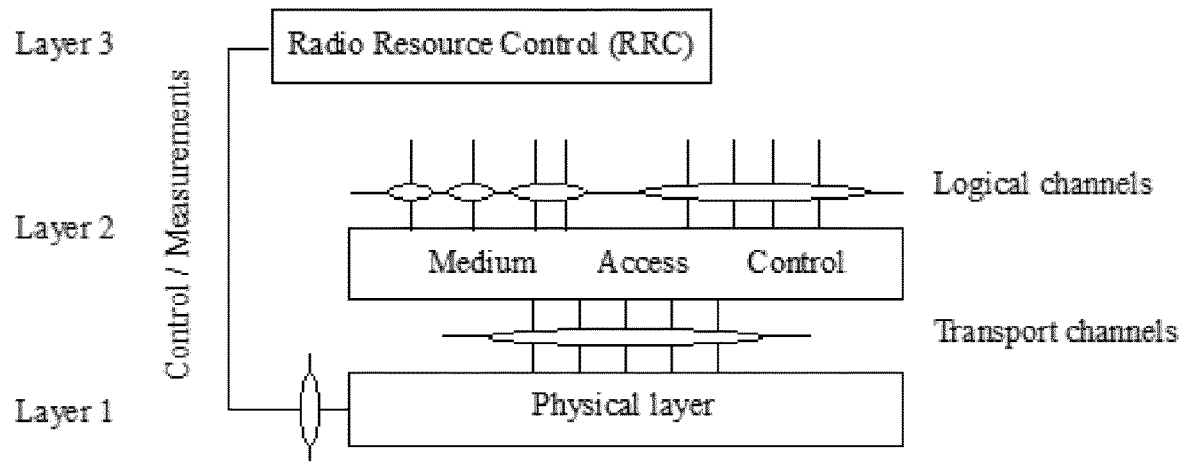
FIG. 4 is a block diagram of an exemplary LTE radio interface protocol architecture from the perspective of the PHY layer.
Figure 5:
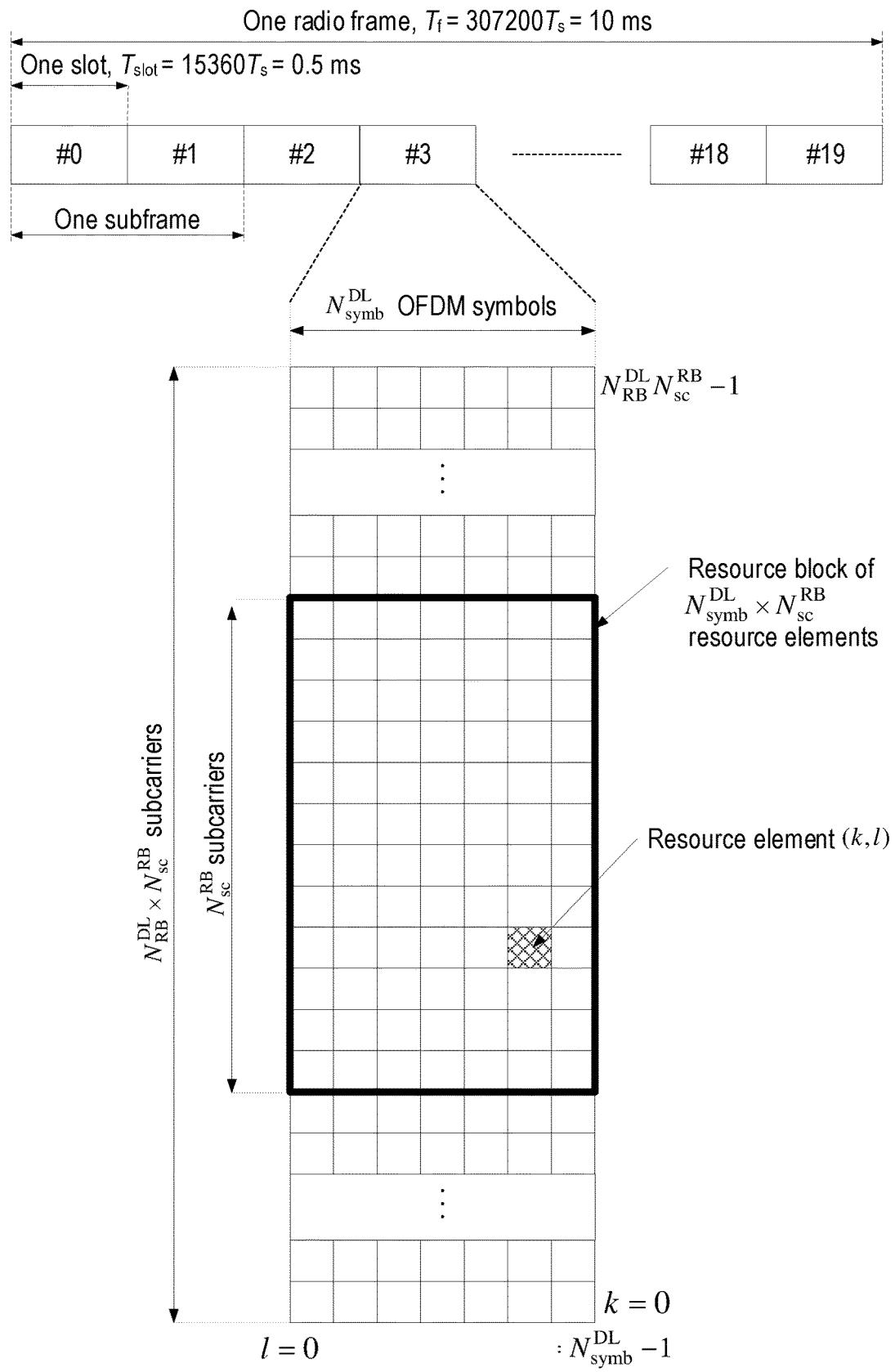
FIGS. 5 and 6 are block diagrams, respectively, of exemplary downlink and uplink LTE radio frame structures used for frequency division duplexing (FDD) operation.
Figure 6:
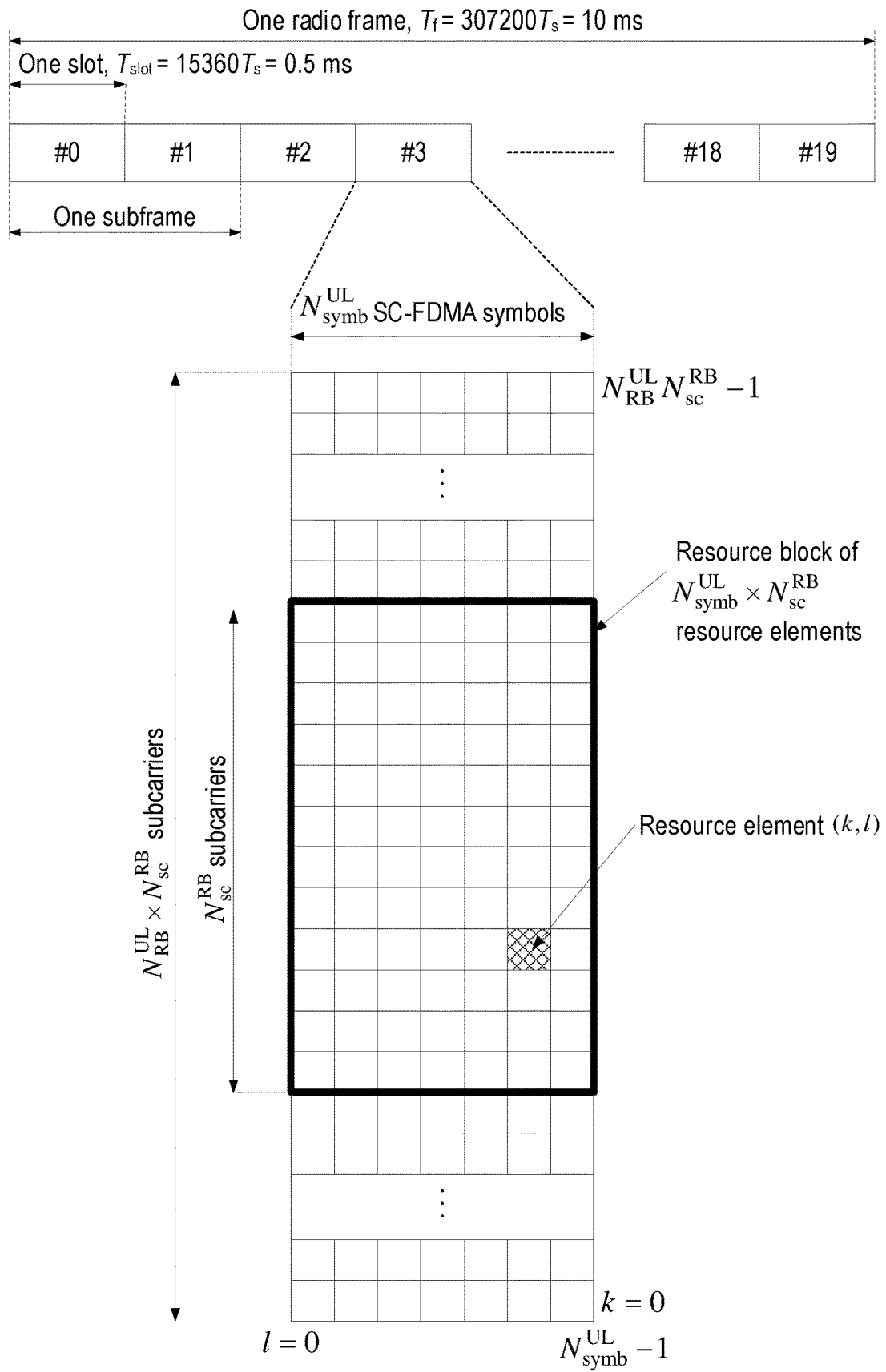
Figure 7:
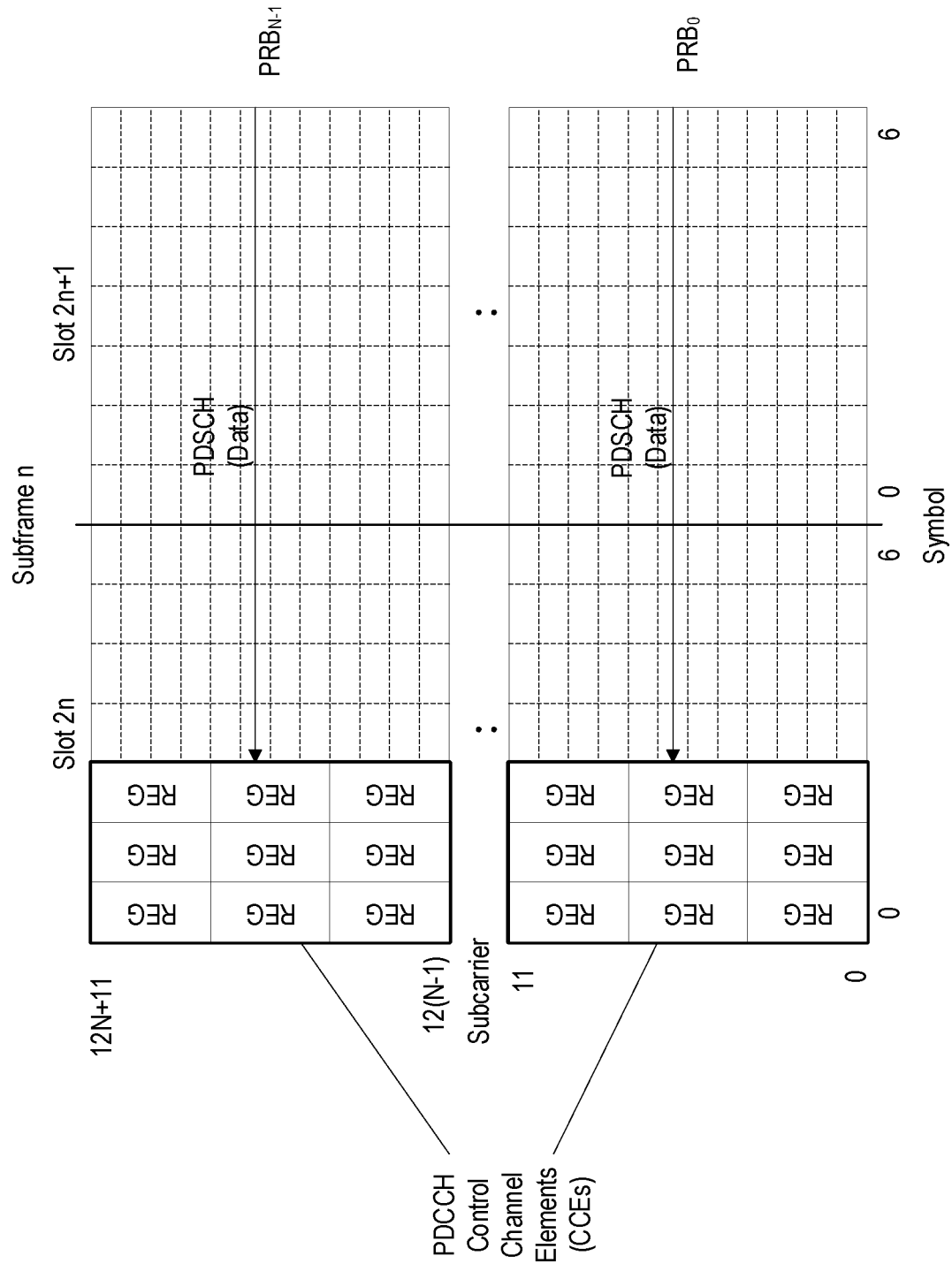
FIG. 7 shows an exemplary manner in which the CCEs and REGs can be mapped to a physical resource.

Each of the gNBs 1010a,b can support the NR radio interface, including frequency division duplexing (FDD), time division duplexing (TDD), or a combination thereof. In contrast, each of ng-eNBs 1020a,b supports the LTE radio interface but, unlike conventional LTE eNBs (e.g., eNBs 105-115 shown in FIG. 1), connect to the 5GC via the NG interface. In addition, the gNBs 1010a,b and ng-eNBs 1020a,b can provide multi-RAT (radio access technology) dual connectivity (MR-DC) to UEs as described above, including NG-RAN E-UTRA/NR Dual Connectivity (NGEN-DC).

Each of the gNBs 1010a,b can include a central (or centralized) unit (CU or gNB-CU) and one or more distributed (or decentralized) units (DU or gNB-DU). Likewise, each of the en-gNBs 920a,b shown in FIG. 17 can include a CU and one or more DUs. The CUs are logical nodes that host higher-layer protocols and perform various gNB functions such controlling the operation of DUs. Similarly, the DUs are logical nodes that host lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 19:
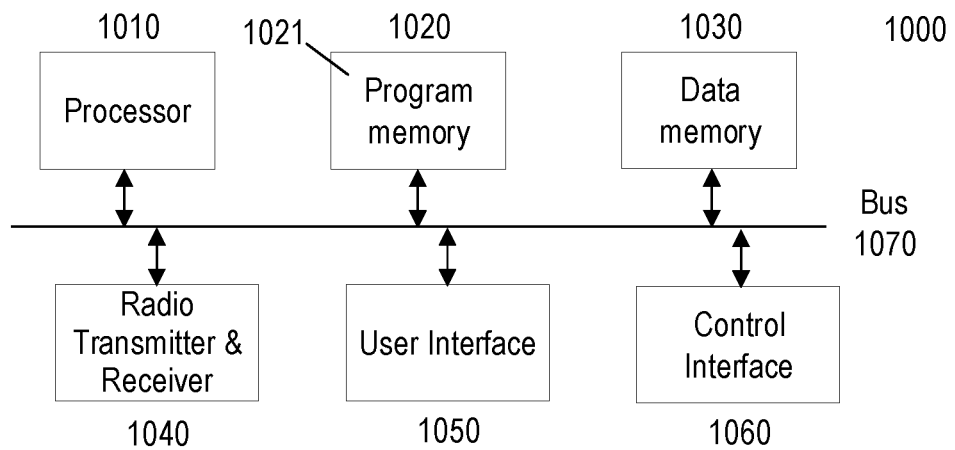
FIG. 19 is a block diagram of an exemplary wireless device or user equipment (UE), according to various exemplary embodiments of the present disclosure.

FIG. 19 shows a block diagram of an exemplary wireless device or user equipment (UE) 1100 configurable according to various exemplary embodiments of the present disclosure, including execution of instructions on a computer-readable medium that correspond to operations of one or more exemplary methods and/or procedures described herein above.

Exemplary device 1100 can comprise a processor 1110 that can be operably connected to a program memory 1120 and/or a data memory 1130 via a bus 1170 that can comprise parallel address and data buses, serial ports, or other methods and/or structures known to those of ordinary skill in the art. Program memory 1120 can store software code, programs, and/or instructions (collectively shown as computer program product 1121 in FIG. 19) executed by processor 1110 that can configure and/or facilitate device 1100 to perform various operations, including exemplary methods and/or procedures described herein.

More generally, program memory 1120 can store software code or program executed by processor 1110 that facilitates, causes and/or programs exemplary device 1100 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1140, user interface 1150, and/or host interface 1160.

As a more specific example, processor 1110 can execute program code stored in program memory 1120 that corresponds to MAC, RLC, PDCP, and RRC layer protocols standardized by 3GPP (e.g., for NR and/or LTE). As a further example, processor 1110 can execute program code stored in program memory 1120 that, together with radio transceiver 1140, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1120 can also store software code executed by processor 1110 to control the functions of device 1100, including configuring and controlling various components such as radio transceiver 1140, user interface 1150, and/or host interface 1160. Program memory 1120 can also store one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition or as an alternative, program memory 1120 can comprise an external storage arrangement (not shown) remote from device 1100, from which the instructions can be downloaded into program memory 1120 located within or removably coupled to device 1100, so as to enable execution of such instructions.

Data memory 1130 can comprise memory area for processor 1110 to store variables used in protocols, configuration, control, and other functions of device 1100, including operations corresponding to, or comprising, any of the exemplary methods and/or procedures described herein. Moreover, program memory 1120 and/or data memory 1130 can comprise non-volatile memory (e.g., flash memory), volatile memory (e.g., static or dynamic RAM), or a combination thereof. Furthermore, data memory 1130 can comprise a memory slot by which removable memory cards in one or more formats (e.g., SD Card, Memory Stick, Compact Flash, etc.) can be inserted and removed. Persons of ordinary skill in the art will recognize that processor 1110 can comprise multiple individual processors (including, e.g., multi-core processors), each of which implements a portion of the functionality described above. In such cases, multiple individual processors can be commonly connected to program memory 1120 and data memory 1130 or individually connected to multiple individual program memories and or data memories. More generally, persons of ordinary skill in the art will recognize that various protocols and other functions of device 1100 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1140 can comprise radio-frequency transmitter and/or receiver functionality that facilitates the device 1100 to communicate with other equipment supporting like wireless communication standards and/or protocols. In some exemplary embodiments, the radio transceiver 1140 includes a transmitter and a receiver that enable device 1100 to communicate with various 5G/NR networks according to various protocols and/or methods proposed for standardization by 3GPP and/or other standards bodies. For example, such functionality can operate cooperatively with processor 1110 to implement a PHY layer based on OFDM, OFDMA, and/or SC-FDMA technologies, such as described herein with respect to other figures. In some exemplary embodiments, the radio transceiver 1140 can comprise some or all of the receiver functionality shown in and described above with reference to FIG. 8.

In some exemplary embodiments, the radio transceiver 1140 includes an LTE transmitter and receiver that can facilitate the device 1100 to communicate with various LTE LTE-Advanced (LTE-A), and/or NR networks according to standards promulgated by 3GPP. In some exemplary embodiments of the present disclosure, the radio transceiver 1140 includes circuitry, firmware, etc. necessary for the device 1100 to communicate with various 5G/NR, LTE, LTE-A, UMTS, and/or GSM/EDGE networks, also according to 3GPP standards. In some exemplary embodiments of the present disclosure, radio transceiver 1140 includes circuitry, firmware, etc. necessary for the device 1100 to communicate with various CDMA2000 networks, according to 3GPP2 standards.

In some exemplary embodiments of the present disclosure, the radio transceiver 1140 is capable of communicating using radio technologies that operate in unlicensed frequency bands, such as IEEE 802.11 WiFi that operates using frequencies in the regions of 2.4, 5.11, and/or 110 GHz. In some exemplary embodiments of the present disclosure, radio transceiver 1140 can comprise a transceiver that is capable of wired communication, such as by using IEEE 802.3 Ethernet technology. The functionality particular to each of these embodiments can be coupled with or controlled by other circuitry in the device 1100, such as the processor 1110 executing program code stored in program memory 1120 in conjunction with, or supported by, data memory 1130.

User interface 1150 can take various forms depending on the particular embodiment of device 1100, or can be absent from device 1100 entirely. In some exemplary embodiments, user interface 1150 can comprise a microphone, a loudspeaker, slidable buttons, depressable buttons, a display, a touchscreen display, a mechanical or virtual keypad, a mechanical or virtual keyboard, and/or any other user-interface features commonly found on mobile phones. In other embodiments, the device 1100 can comprise a tablet computing device including a larger touchscreen display. In such embodiments, one or more of the mechanical features of the user interface 1150 can be replaced by comparable or functionally equivalent virtual user interface features (e.g., virtual keypad, virtual buttons, etc.) implemented using the touchscreen display, as familiar to persons of ordinary skill in the art. In other embodiments, the device 1100 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1100 having a touch screen display are capable of receiving user inputs, such as inputs related to exemplary methods and/or procedures described herein or otherwise known to persons of ordinary skill in the art.

In some exemplary embodiments of the present disclosure, device 1100 can comprise an orientation sensor, which can be used in various ways by features and functions of device 1100. For example, the device 1100 can use outputs of the orientation sensor to determine when a user has changed the physical orientation of the device 1100's touch screen display. An indication signal from the orientation sensor can be available to any application program executing on the device 1100, such that an application program can change the orientation of a screen display (e.g., from portrait to landscape) automatically when the indication signal indicates an approximate 110-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1160 of the device 1100 can take various forms depending on the particular exemplary embodiment of device 1100 and of the particular interface requirements of other devices that the device 1100 is intended to communicate with and/or control. For example, the control interface 1160 can comprise an RS-232 interface, an RS-485 interface, a USB interface, an HDMI interface, a Bluetooth interface, an IEEE 11114 ("Firewire") interface, an $I^2C$ interface, a PCMCIA interface, or the like. In some exemplary embodiments of the present disclosure, control interface 1160 can comprise an IEEE 802.3 Ethernet interface such as described above. In some exemplary embodiments of the present disclosure, the control interface 1160 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1100 can comprise more functionality than is shown in FIG. 19 including, for example, a video and/or still-image camera, microphone, media player and/or recorder, etc. Moreover, radio transceiver 1140 can include circuitry necessary to communicate using additional radio-frequency communication standards including Bluetooth, GPS, and/or others. Moreover, the processor 1110 can execute software code stored in the program memory 1120 to control such additional functionality. For example, directional velocity and/or position estimates output from a GPS receiver can be available to any application program executing on the device 1100, including various exemplary methods and/or computer-readable media according to various exemplary embodiments of the present disclosure.

Figure 20:
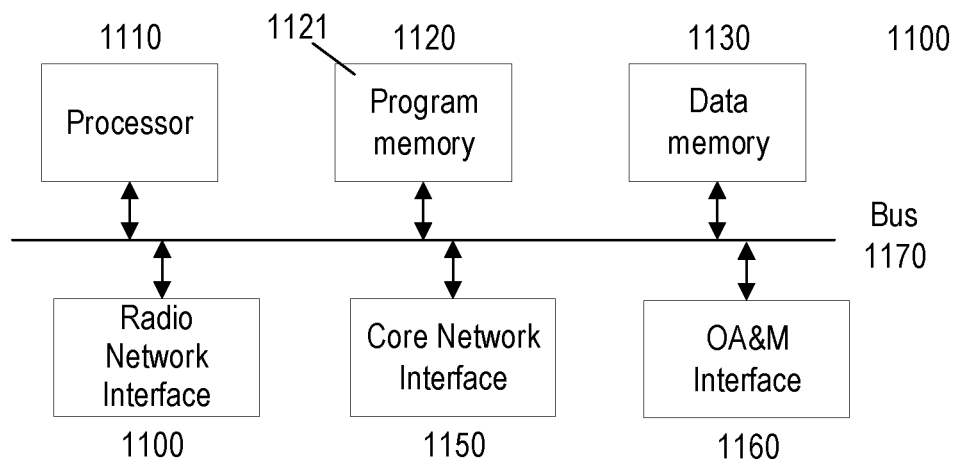
FIG. 20 is a block diagram of an exemplary network node (e.g., a base station, eNB, or gNB), according to various exemplary embodiments of the present disclosure.

FIG. 20 shows a block diagram of an exemplary network node 1200 configurable according to various embodiments of the present disclosure, including those described above with reference to other figures. In some exemplary embodiments, network node 1200 can comprise a base station, eNB, gNB, or component thereof. Network node 1200 comprises processor 1210 which is operably connected to program memory 1220 and data memory 1230 via bus 1270, which can comprise parallel address and data buses, serial ports, or other methods and/or structures known to those of ordinary skill in the art. In some exemplary embodiments, processor 1210 can comprise some or all of the functionality of processor 500 shown in FIG. 8 and discussed in more detail above.

Program memory 1220 can store software code, programs, and/or instructions (collectively shown as computer program product 1221 in FIG. 20) executed by processor 1210 that can configure and/or facilitate network node 900 to communicate with one or more other devices using protocols according to various embodiments of the present disclosure, including one or more exemplary methods and/or procedures discussed above. Program memory 1220 can also store software code executed by processor 1210 that can facilitate and specifically configure network node 1200 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1240 and core network interface 1250. Program memory 1220 can also store software code executed by processor 1210 to control the functions of network node 1200, including configuring and controlling various components such as radio network interface 1240 and core network interface 1250.

Data memory 1230 can comprise memory area for processor 1210 to store variables used in protocols, configuration, control, and other functions of network node 1200. As such, program memory 1220 and data memory 1230 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1210 can comprise multiple individual processors (not shown), each of which implements a portion of the functionality described above. In such case, multiple individual processors may be commonly connected to program memory 1220 and data memory 1230 or individually connected to multiple individual program memories and/or data memories. More generally, persons of ordinary skill in the art will recognize that various protocols and other functions of network node 1200 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1240 can comprise transmitters, receivers, signal processors, ASICs, antennas, beamforming units, and other circuitry that enables network node 1200 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1240. According to further exemplary embodiments of the present disclosure, the radio network interface 1240 can comprise a PHY layer based on OFDM, OFDMA, and/or SC-FDMA technologies. In some embodiments, the functionality of such a PHY layer can be provided cooperatively by radio network interface 1240 and processor 1210 (including program code in memory 1220).

Core network interface 1250 can comprise transmitters, receivers, and other circuitry that enables network node 1200 to communicate with other equipment in a core network such as, in some embodiments, circuit-switched (CS) and/or packet-switched Core (PS) networks. In some embodiments, core network interface 1250 can comprise the S1 interface standardized by 3GPP. In some exemplary embodiments, core network interface 1250 can comprise one or more interfaces to one or more SGWs, MMES, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of core network interface 1250 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

By way of example and without limitation, core network interface 1250 can comprise one or more of the S1, S1-U, and NG interfaces standardized by 3GPP. Also by way of example, radio network interface 1240 can comprise the Uu interface standardized by 3GPP.

OA&M interface 1260 can comprise transmitters, receivers, and other circuitry that enables network node 1200 to communicate with external networks, computers, databases, and the like for purposes of operations, administration, and maintenance of network node 1200 or other network equipment operably connected thereto. Lower layers of OA&M interface 1260 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

Moreover, in some embodiments, one or more of radio network interface 1240, core network interface 1250, and OA&M interface 1260 may be multiplexed together on a single physical interface, such as the examples listed above.

Figure 21:
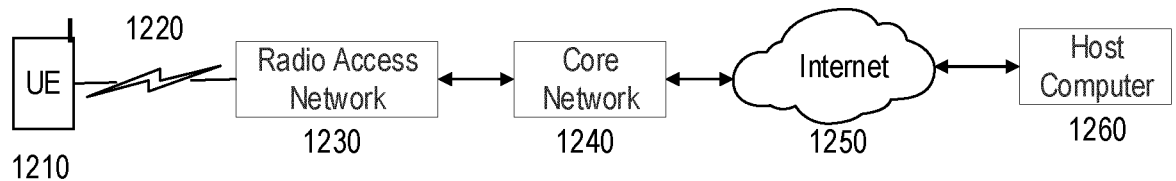
FIG. 21 is a block diagram of an exemplary network configuration usable to provide over-the-top (OTT) data services between a host computer and a user equipment, according to various exemplary embodiments of the present disclosure.

FIG. 21 is a block diagram of an exemplary network configuration usable to provide over-the-top (OTT) data services between a host computer and a user equipment (UE), according to one or more exemplary embodiments of the present disclosure. UE 1310 can communicate with radio access network (RAN) 1330 over radio interface 1320, which can be based on protocols described above including, e.g., LTE, LTE-A, and 5G/NR. RAN 1330 can include one or more network nodes (e.g., base stations, eNBs, gNBs, ng-eNBs, en-gNBs, controllers, etc.). RAN 1330 can further communicate with core network 1340 according to various protocols and interfaces described above. For example, one or more apparatus (e.g., base stations, eNBs, gNBs, etc.) comprising RAN 1330 can communicate to core network 1340 via core network interface 1450 described above. In some exemplary embodiments, RAN 1330 and core network 1340 can be configured and/or arranged as shown in other figures discussed above. Similarly, UE 1310 can also be configured and/or arranged as shown in other figures discussed above.

Core network 1340 can further communicate with an external packet data network, illustrated in FIG. 21 as Internet 1350, according to various protocols and interfaces known to persons of ordinary skill in the art. Many other devices and/or networks can also connect to and communicate via Internet 1350, such as exemplary host computer 1360. In some exemplary embodiments, host computer 1360 can communicate with UE 1310 using Internet 1350, core network 1340, and RAN 1330 as intermediaries. Host computer 1360 can be a server (e.g., an application server) under ownership and/or control of a service provider. Host computer 1360 can be operated by the OTT service provider or by another entity on the service provider's behalf.

For example, host computer 1360 can provide an over-the-top (OTT) packet data service to UE 1310 using facilities of core network 1340 and RAN 1330, which can be unaware of the routing of an outgoing/incoming communication to/from host computer 1360. Similarly, host computer 1360 can be unaware of routing of a transmission from the host computer to the UE, e.g., the routing of the transmission through RAN 1330. Various OTT services can be provided using the exemplary configuration shown in FIG. 21 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 21 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Exemplary embodiments that avoid unnecessary instances of early SSB reception and AGC/AFC calibration when there is no significant change of RF gain and/or frequency error reduce UE energy consumption during RRC_IDLE or RRC_INACTIVE modes. These improvements can play a critical role by enabling UE 1310 and RAN 1330 to support OTT services between host computer 1360 and UE 1310. For example, by reducing UE energy consumption in RRC_IDLE and/or RRC_INACTIVE, such techniques leave more stored energy for the UE to use for active-mode OTT services, such as streaming audio and/or video. As such, UEs can use such OTT services for longer durations without needing to replenish their store energy (i.e., recharge battery), thereby benefiting users as well as OTT providers.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art.

Example embodiments of the methods, apparatus, and computer-readable media described herein include, but are not limited to, the following enumerated embodiments:

1. A method for calibrating a user equipment (UE) receiver during operation of the UE in a wireless network, the method comprising:
    determining one or more calibration error thresholds for respective one or more parameters associated with the receiver;
    for each of the one or more parameters, determining first and second parameter values based on receiving respective first and second reference signals from the wireless network;

for each of the one or more parameters, determining a difference between the first and second parameter values;

selectively receiving one or more third reference signals from the wireless network based on the determined differences and the calibration error thresholds.

2. The method of embodiment 1, wherein selectively receiving the third reference signal comprises:

comparing each determined difference to a corresponding calibration error threshold; and based on at least one determined difference being greater than the corresponding calibration error threshold, exiting low-power operation and receiving the subsequent reference signal.

3. The method of any of embodiments 1-2, wherein selectively receiving the third reference signal comprises, based on all determined differences being less than or equal to the corresponding calibration error thresholds, remaining in low-power operation and foregoing reception of the third reference signal.

4. The method of any of embodiments 2-3, wherein the low-power operation comprises deep sleep during one of the following: idle mode, or inactive mode.

5. The method of any of embodiments 1-4, wherein determining the one or more calibration error thresholds comprises:

receiving a first message from the wireless network;

determining the one or more calibration error thresholds based on a quality metric associated with the first message.

6. The method of embodiment 5, wherein the first message is received via a physical downlink control channel (PDCCH).

7. The method of any of embodiments 5-6, wherein the first message includes paging information related to the UE.

8. The method of any of embodiments 1-4, wherein determining the one or more calibration error thresholds comprises receiving the calibration error thresholds from the wireless network as part of a configuration for the UE.

9. The method of any of embodiments 1-8, wherein determining first and second parameter values based on receiving respective first and second reference signals from the wireless network comprises:

exiting low-power operation and receiving the first reference signal;

calibrating the receiver based on the first parameter values; and returning to low-power operation.

10. The method of embodiment 9, wherein calibrating the receiver based on the first parameter values comprises performing one or more of the following operations: automatic gain control (AGC) and automatic frequency control (AFC).

11. The method of any of embodiments 9-10, wherein determining first and second parameter values based on receiving respective first and second reference signals from the wireless network further comprises:

subsequently exiting low-power operation and receiving the second reference signal; and calibrating the receiver based on the second parameter values.

12. The method of any of embodiments 1-11, further comprising:

exiting low-power operation and receiving a second message from the wireless network; and modifying at least one of calibration error thresholds based on a decoding metric associated with the second message.

13. The method of any of embodiments 1-12, further comprising:

exiting low-power operation and determining, for each of the one or more parameters, further first and second parameter values based on receiving further respective first and second reference signals from the wireless network; and for each of the one or more parameters, determining a further difference between the further first and second parameter values.

14. The method of embodiment 13, further comprising performing at least one of the following operations based on the determined further differences:

modifying at least one of the calibration error thresholds; and increasing or decreasing the number of third reference signals that are subject to selective reception.

15. The method of any of embodiments 1-14, wherein the one or more parameters include one or more of the following: receiver gains, and local-oscillator (LO) frequency error.

16. The method of any of embodiments 1-15, wherein the third reference signal is the nearest preceding reference signal relative to a physical downlink control channel (PDCCH) reception occasion for the UE.

17. The method of any of embodiments 1-16, wherein the first, second, and third reference signals are respective first, second, and third synchronization signal and PBCCH blocks (SSBs).

18. A user equipment (UE) configured to calibrate a receiver during operation in a wireless network, the UE comprising:

a radio transceiver configured to communicate with the wireless network; and processing circuitry operatively associated with the radio transceiver and configured to perform operations corresponding to the methods of any of exemplary embodiments 1-17.

19. A user equipment (UE) configured to calibrate a receiver during operation in a wireless network, the UE being further arranged to perform operations corresponding to the methods of any of embodiments 1-17.

20. A non-transitory, computer-readable medium storing computer-executable instructions that, when executed by at least one processor of a user equipment (UE), configure the UE to perform operations corresponding to the methods of any of exemplary embodiments 1-17.

21. A computer program product comprising computer-executable instructions that, when executed by at least one processor of a user equipment (UE), configure the UE to perform operations corresponding to the methods of any of exemplary embodiments 1-17.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method for calibrating a user equipment (UE) receiver during operation of the UE in a wireless network, the method comprising:
    receiving a first reference signal associated with a first reception condition;
    receiving a second reference signal associated with a second reception condition;
    when the conditions of the first and second reception conditions differ above a first threshold, receiving a third reference signal and receiving a message with a receiver setting based on a third reception condition associated with the third reference signal;
    when the conditions of the first and second reception conditions differ below the first threshold, omitting reception of the third reference signal and receiving the message with a receiver setting based on a reception condition associated with any one of the first and the second reference signals, and
    adjusting the first threshold based on a historical success rate of receiving the message.

2. The method of claim 1, wherein:
    the message comprises a Physical Downlink Control Channel (PDCCH) message; and
    the first, second, and third reference signals are synchronization signals.

3. The method of claim 1, wherein the third reference signal is a nearest preceding reference signal relative to a reception occasion of the message.

4. The method of claim 1, wherein the third reference signal is an arbitrary preceding reference signal relative to a reception occasion of the message.

5. The method of claim 1, wherein the respective first, second, and third reception conditions are associated or include one or more of the following parameters for calibrating the UE: receiver gain, receiver timing, and local-oscillator frequency.

6. The method of claim 1, wherein the first, second, and third reference signals are included in respective synchronization signal blocks (SSBs).

7. The method of claim 1, further comprising, when the conditions of the first and second reception conditions differ below the first threshold but the conditions of the first and second reception conditions are below a second threshold, receiving the third reference signal and receiving the message with the receiver setting based on the third reception condition associated with the third reference signal.

8. A non-transitory, computer-readable medium storing computer-executable instructions that, when executed by processing circuitry of a user equipment (UE), configure the UE to perform operations corresponding to the method of claim 1.

9. A user equipment (UE) configured to calibrate a receiver during operation in a wireless network, the UE comprising:
    a receiver configured to communicate with the wireless network; and
    processing circuitry operatively associated with the receiver, whereby the processing circuitry and the receiver are arranged to:
        receive a first reference signal associated with a first reception condition;
        receive a second reference signal associated with a second reception condition;
        when the conditions of the first and second reception conditions differ above a first threshold, receive a third reference signal and receive a message with a receiver setting based on a third reception condition associated with the third reference signal;
        when the conditions of the first and second reception conditions differ below the first threshold, omit reception of the third reference signal and receive the message with a receiver setting based on a reception condition associated with any one of the first and the second reference signals, and
        adjust the first threshold based on a historical success rate of receiving the message.

10. The UE of claim 9, wherein:
    the message comprises a Physical Downlink Control Channel (PDCCH) message; and
    the first, second, and third reference signals are synchronization signals.

11. The UE of claim 9, wherein the third reference signal is a nearest preceding reference signal relative to a reception occasion of the message.

12. The UE of claim 9, wherein the third reference signal is an arbitrary preceding reference signal relative to a reception occasion of the message.

13. The UE of claim 9, wherein the respective first, second, and third reception conditions are associated or include one or more of the following parameters for calibrating the UE: receiver gain, receiver timing, and local-oscillator frequency.

14. The UE of claim 9, wherein the first, second, and third reference signals are included in respective synchronization signal blocks (SSBs).

15. The UE of claim 9, whereby the processing circuitry and the receiver are further arranged to, when the conditions of the first and second reception conditions differ below the first threshold but the conditions of the first and second reception conditions are below a second threshold, receive the third reference signal and receive the message with the receiver setting based on the third reception condition associated with the third reference signal.

* * * * *